US006757461B2

United States Patent
Matsuoka et al.

(10) Patent No.: US 6,757,461 B2
(45) Date of Patent: Jun. 29, 2004

(54) TUNABLE DISPERSION COMPENSATION DEVICE, OPTICAL RECEIVER, AND OPTICAL FIBER COMMUNICATION SYSTEM

(75) Inventors: Ken Matsuoka, Tokyo (JP); Toshiyuki Hirai, Tokyo (JP); Minoru Hashimoto, Tokyo (JP); Akihiko Kato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 126 days.

(21) Appl. No.: 10/054,960

(22) Filed: Jan. 25, 2002

(65) Prior Publication Data

US 2002/0186929 A1 Dec. 12, 2002

Related U.S. Application Data

(63) Continuation-in-part of application No. 09/996,873, filed on Nov. 30, 2001.

(30) Foreign Application Priority Data

Jun. 11, 2001 (JP) ........................................ 2001-175806
Dec. 5, 2001 (JP) ........................................ 2001-371848

(51) Int. Cl.[7] ............................. G02F 1/295; G02B 6/34
(52) U.S. Cl. ............................. 385/37; 385/10; 385/40
(58) Field of Search ................................ 385/1, 2, 4, 8, 385/10, 24, 31, 37, 39, 40, 49; 359/81–84

(56) References Cited

U.S. PATENT DOCUMENTS

| 5,982,963 A | * | 11/1999 | Feng et al. ................... 385/37 |
| 6,411,746 B1 | | 6/2002 | Chamberlain et al. |
| 2002/0044743 A1 | * | 4/2002 | Takeuchi et al. .............. 385/37 |
| 2002/0048430 A1 | | 4/2002 | Hashimoto et al. |
| 2002/0114570 A1 | * | 8/2002 | Matsumoto et al. .......... 385/37 |

FOREIGN PATENT DOCUMENTS

| JP | 10-221658 | 8/1998 |
| JP | 2000-137197 | 5/2000 |
| JP | 2000-235170 | 8/2000 |
| JP | 2000-244394 | 9/2000 |
| JP | 2000-252920 | 9/2000 |

\* cited by examiner

Primary Examiner—Hemang Sanghavi
Assistant Examiner—Omar Rojas
(74) Attorney, Agent, or Firm—Burns, Doane, Swecker & Mathis, L.L.P.

(57) ABSTRACT

A tunable dispersion compensation device comprises an optical waveguide having a grating, a plurality of heaters arranged along an optical axis of the optical waveguide, and a pulsed-current supplying unit for producing a desired temperature distribution in the grating by supplying a plurality of pulsed currents to the plurality of heaters, respectively. The grating can be a chirped grating. The pulsed-current supplying unit can include a pulse width control unit for adjusting the pulse widths of the plurality of pulsed currents supplied to the plurality of heaters, respectively, according to the desired temperature distribution to be produced in the grating. Preferably, the pulsed-current supplying unit supplies the plurality of pulsed currents to the plurality of heaters at different times, respectively.

24 Claims, 15 Drawing Sheets

TUNABLE DISPERSION COMPENSATION DEVICE, OPTICAL RECEIVER, AND OPTICAL FIBER COMMUNICATION SYSTEM

CROSS REFERENCE

This application is a continuation-in-part of Ser. No. 09/996,873 filed on Nov. 30, 2001.

BACKGROUND OF THE INVENTION

1. Field of the Invention

The present invention relates to a tunable dispersion compensation device for dynamically compensating for chromatic dispersion in an optical fiber which is a transmission path for use in an optical fiber communication system, an optical receiver including such a tunable dispersion compensation device, and an optical fiber communication system including such a tunable dispersion compensation device.

2. Description of the Prior Art

In recent years, as it has become desirable to utilize many channels (i.e., many optical signals) over a wider range of wavelengths to carry a lot of information via an optical fiber which is a transmission path in an optical fiber communication system, such as a wavelength division multiplexing (WDM) system, chromatic dispersion (group delay dispersion) in the optical fiber has required more precise compensation. Chromatic dispersion in an optical fiber causes spectral components of different wavelengths included in an optical signal to propagate through the optical fiber at different speeds, thereby inducing pulse broadening in the optical signal. For example, a single mode fiber used for optical fiber communication systems provides abnormal dispersion (negative group velocity dispersion) for an optical signal of a wavelength of 1550 nm, the chromatic dispersion having a positive sign and being typically equal to about 17 ps/nm/km. In other words, spectral components of shorter wavelengths included in an optical signal propagate through the single mode fiber faster than other spectral components of longer wavelengths, and the pulse width of an optical signal having a spectral width of 1 nm increases only by about 17 ps every time the optical signal propagates through a 1 km length of the single mode fiber, for example. Two adjacent pulses in an optical pulse train that propagates through an optical fiber can thus overlap with each other at a high data rate. Such pulse overlapping can cause errors in data transmission.

In order to compensate for such chromatic dispersion in an optical fiber which is a transmission path, a dispersion compensation fiber and an optical waveguide, such as an optical fiber, including a chirped grating, which provide group velocity dispersion of a sign opposite to the dispersion in the optical fiber have been developed. On the other hand, there is a problem that chromatic dispersion in an optical fiber may vary with time because of a change in the temperature of the optical fiber, a change in the connection of the optical fiber, a change in the stress placed on the optical fiber due to external forces, and so on. Since those prior art dispersion compensation devices can only compensate for a fixed amount of chromatic dispersion, they cannot deal with such a problem. Particularly, in optical fiber communication systems that operate at 40 Gbit/s or higher, since a slight transition in the status of a transmission path changes the chromatic dispersion, it is forecast that a dynamic dispersion compensation is needed.

FIG. 17 is a diagram showing the structure of a prior art tunable dispersion compensation device as disclosed in Japanese patent application publications No. 10-221658, No. 2000-235170, and No. 2000-252920, to solve the above-mentioned problem. In the figure, reference numeral 2 denotes an optical waveguide in which a chirped grating having a grating pitch (i.e., grating period) that continuously changes along its optical axis is formed, reference numerals 3-1 to 3-$n$ denote a plurality of heaters for producing a desired temperature distribution in the optical waveguide 2, respectively, and reference numerals 8-1 to 8-$n$ denote a plurality of electrodes via each of which an electric current flows into a corresponding heater, respectively.

In operation, since the nearer to an input/output end of the optical waveguide 2 the longer grating pitch and hence the longer Bragg reflection wavelength the grating has, spectral components having longer wavelengths in an optical signal are reflected back at locations nearer to the input/output end of the optical waveguide 2 and are output via the input/output end. In other words, spectral components of shorter wavelengths in an optical signal reach locations within the optical waveguide 2, which are further from the input/output end of the optical waveguide 2, and are reflected back at the locations corresponding to the Bragg reflection wavelengths decided by the grating pitches. Therefore, different spectral components in an optical signal are reflected back at different locations in the optical waveguide 2 and thus have different delays. As a result, when an optical signal with a broadened pulse width in which spectral components of shorter wavelengths exist at more forward parts thereof is incident on the optical waveguide 2, the pulse width of the optical signal is compressed and is emitted out of the optical waveguide 2.

The optical waveguide 2 is made of a material, such as silica glass, whose refractive index changes according to its temperature. A desired temperature distribution can be produced along the length of the optical waveguide 2 by adjusting the electric power applied to each of the plurality of heaters 3-1 to 3-$n$ by way of a corresponding one of the plurality of electrodes 8-1 to 8-$n$. When the optical waveguide 2 is heated by the plurality of heaters 3-1 to 3-$n$ so as to have a desired temperature distribution, the grating pitch and refractive index of each segment of the chirped grating formed in the optical waveguide 2 which is heated by a corresponding one of the plurality of heaters change. As a result, the Bragg reflection wavelength of each segment of the chirped grating changes. The chromatic dispersion provided for an input optical signal by the optical waveguide 2 therefore changes.

Neither of the above-mentioned Japanese patent application publications discloses a concrete method of adjusting the electric power supplied to each of the plurality of heaters 3-1 to 3-$n$ for the purpose of dynamic dispersion compensation. For example, a method of adjusting the electric power to be applied to each of the plurality of heaters by changing the resistance value of a resistor connected in series to a corresponding one of the plurality of heaters can be devised. In this case, a variable resistor is connected to each of the plurality of heaters, and the resistance value of the variable resistor is changed and the electric power supplied to each of the plurality of heaters is therefore adjusted according to a desired temperature distribution to be produced in the chirped grating.

FIG. 18 is a diagram showing the structure of a prior art tunable dispersion compensation device that can dynamically compensate for chromatic dispersion, as disclosed in Japanese patent application publication No. 2000-137197, and FIG. 19 is a diagram schematically showing the structure of an optical fiber communication system including the tunable dispersion compensation device 91 shown in FIG. 18, as disclosed in Japanese patent application publication No. 2000-244394. In FIG. 18, reference numeral 9 denotes a resistive thin film whose thickness changes linearly along the length of an optical waveguide 2, reference numerals 27a and 27b denote electrodes via which an electric current is supplied to the resistive thin film 9, and reference numeral 28 denotes a direct-current power supply for supplying the electric current to the resistive thin film 9 by way of the electrodes 27a and 27b. Furthermore, in FIG. 19, reference numeral 40 denotes an optical transmitter for multiplexing and transmitting a plurality of optical signals of different wavelengths each of which carries information, reference numeral 50 denotes an optical fiber transmission line via which the plurality of multiplexed optical signals are transmitted, reference numeral 90 denotes a dispersion compensation module provided with the tunable dispersion compensation device 91 shown in FIG. 18, on optical circulator 92 for guiding an optical signal which has propagated through the optical fiber transmission line 50 to the tunable dispersion compensation device 91, and a data integrity monitor 93 for monitoring the integrity of data transmitted on the system and for feeding the monitored data integrity back to the tunable dispersion compensation device 91, and reference numeral 100 denotes an optical receiver for receiving the multiplexed optical signals dispersion-compensated by the dispersion compensation module 90, and for demultiplexing the multiplexed optical signals into the plurality of optical signals so as to demodulate information which each of the plurality of optical signals carries.

In operation, the direct-current power supply 28 supplies an electric current to the resistive thin film 9 by way of the electrodes 27a and 27b. As a result, local resistive heating is generated along the length of the optical waveguide 2 so that it is proportional to the local resistance of the resistive thin film 9. This local heating generates a temperature gradient along the length of the grating formed in the optical waveguide 2 to cause the grating to produce a chirp. As previously mentioned, the resistive thin film 9 is so constructed that its resistance varies linearly along the length of the optical waveguide 2, and the grating can achieve a linear chirp.

The optical transmitter 40 multiplexes a plurality of optical signals of different wavelengths, each of which carries information, and then sends them out to the optical fiber transmission line 50. As previously mentioned, the optical fiber transmission line 50 can provide abnormal dispersion (negative group velocity dispersion) for an optical signal of a wavelength of 1550 nm, the chromatic dispersion being typically equal to about 17 ps/nm/km. In other words, spectral components of shorter wavelengths included in an optical signal propagate through the optical fiber transmission line 50 faster than other spectral components of longer wavelengths, and if the optical fiber transmission line 50 has a length of 50 km the accumulated chromatic dispersion can be about 850 ps/nm. The dispersion compensation module 90, which contains the tunable dispersion compensation device 91 shown in FIG. 19, can continuously adjust the chromatic dispersion within a range of −300 ps/nm to −1350 ps/nm. The multiplexed optical signals dispersion-compensated by the dispersion compensation module 90 are further transmitted to the optical receiver 100. The optical receiver 100 demultiplexes the received, multiplexed optical signals into the plurality of optical signals so as to demodulate information which each of the plurality of optical signals carries.

A problem with a prior art tunable dispersion compensation device constructed as above is that since electric power is consumed in a resistor, which is connected in series to each of a plurality of heaters which heat a chirped grating, for adjusting the electric power supplied to each of the plurality of heaters, the electric power consumption in the entire system increases.

Although the other prior art tunable dispersion compensation devices as disclosed in Japanese patent application publication No. 10-221658 and so on do not implement a concrete method of producing a desired temperature distribution by adjusting the electric power to be applied to each of the plurality of heaters 3-1 to 3-n, how to actually control the temperature distribution of the chirped grating according to the chromatic dispersion in the optical fiber which can vary with time, and how to carry out the control with efficiency are important issues.

In addition, although the other prior art tunable dispersion compensation device as disclosed in Japanese patent application publication No. 2000-137197 produces a desired temperature gradient in the optical waveguide 2 by adjusting an electric current that flows through the resistive thin film 9, a problem with the prior art tunable dispersion compensation device is that when a change in the chromatic dispersion to be compensated for results from a change in the status of the optical fiber transmission line 50, it is difficult to change the temperature gradient while maintaining the center of a range of wavelengths over which the optical waveguide 2 can perform dispersion compensation. Another problem with the prior art tunable dispersion compensation device that employs the resistive thin film 9 is that it only generates a fixed temperature gradient for a constant voltage applied to the resistive thin film, and it is therefore difficult to produce a desired temperature gradient due to heat conduction and so on and it is difficult to deal with variations in the grating pitches which occur when the chirped grating is written into the optical waveguide 2. In addition, when the prior art optical fiber communication system that performs dispersion compensation by using the dispersion compensation module 90 which contains such a prior art tunable dispersion compensation device utilizes many channels over a wider range of optical wavelengths to transmit larger amounts of information, the wavelength dependency of the chromatic dispersion of the optical fiber transmission line 50 comes to the surface. When a group delay provided for a spectral component in an optical signal varies with its wavelength, it is necessary to produce a nonlinear temperature gradient in the optical waveguide 2. A problem with the prior art tunable dispersion compensation device disclosed in Japanese patent application publication No. 2000-137197 is, however, that it is difficult to produce a nonlinear temperature gradient with a high degree of accuracy, and it is difficult to achieve dynamic dispersion compensation over a wide range of wavelengths.

Furthermore, another problem with the prior art optical fiber communication system constructed as above is that since each of the plurality of optical signals demultiplexed has residual chromatic dispersion which remains to be compensated for and chromatic dispersion due to nonlinear effects of the optical receiver, and the chromatic dispersion varies with time, it is difficult to ensure complete restoration of all the plurality of optical signals received at the optical receiver and at times.

SUMMARY OF THE INVENTION

The present invention is proposed to solve the above-mentioned problems, and it is therefore an object of the present invention to provide a tunable dispersion compensation device that can dynamically compensate for chromatic dispersion in an optical fiber transmission line by producing a temperature distribution (i.e., temperature gradient) in a chirped grating with efficiency and changing the temperature distribution according to the chromatic dispersion which varies with time, and an optical receiver provided with the tunable dispersion compensation device.

It is a further object of the present invention to provide an optical fiber communication system that can efficiently, precisely, and dynamically compensate for chromatic dispersion in the system including an optical fiber transmission line whose chromatic dispersion varies with time and an optical receiver.

In accordance with an aspect of the present invention, there is provided a tunable dispersion compensation device comprising: an optical waveguide having a grating; a plurality of heaters arranged along an optical axis of the optical waveguide; and a pulsed-current supplying unit for producing a desired temperature distribution in the grating by supplying a plurality of pulsed currents to the plurality of heaters, respectively. Accordingly, the present invention offers an advantage of being able to perform dispersion compensation with efficiency.

In accordance with another aspect of the present invention, the grating is a chirped grating.

In accordance with a further aspect of the present invention, the pulsed-current supplying unit includes a pulse width control unit for adjusting pulse widths of the plurality of pulsed currents supplied to the plurality of heaters, respectively, according to the desired temperature distribution to be produced in the grating.

In accordance with another aspect of the present invention, the pulsed-current supplying unit supplies the plurality of pulsed currents to the plurality of heaters at different times, respectively. Accordingly, the tunable dispersion compensation device can reduce the peak value of an electric current that flows from the pulsed-current supplying unit to the plurality of heaters.

In accordance with a further aspect of the present invention, the pulsed-current supplying unit divides the plurality of pulsed currents into a plurality of groups and supplies pulsed currents included in different groups to corresponding heaters at different times, respectively.

In accordance with another aspect of the present invention, the pulsed-current supplying unit includes a DC power supply, an EMI elimination filter for eliminating noise included in a DC output from the DC power supply, and a switching unit for generating the plurality of pulsed currents from an output of the EMI elimination filter. Accordingly, the present invention offers an advantage of being able to reduce the load imposed on the DC power supply which is the source of the pulsed-current supplying unit and to downsize the EMI elimination filter which is used to eliminate switching noise included in the output of the DC power supply.

In accordance with a further aspect of the present invention, the pulse widths of the plurality of pulsed currents supplied to the plurality of heaters, respectively are increased or decreased in order that the plurality of heaters respectively associated with the plurality of pulsed currents are arranged along the optical axis of the waveguide.

In accordance with another aspect of the present invention, the pulse widths of the plurality of pulsed currents are increased or decreased linearly.

In accordance with a further aspect of the present invention, the pulse width control unit includes a pulse width determining unit for determining the pulse widths of the plurality of pulsed currents based on an initial value and a pulse width increment.

In accordance with another aspect of the present invention, the pulse width control unit includes a correction unit for correcting the pulse widths of the plurality of pulsed currents determined by the pulse width determining unit using a plurality of correction coefficients that are predetermined for the plurality of heaters, respectively.

In accordance with a further aspect of the present invention, the pulse widths of the plurality of pulsed currents supplied to the plurality of heaters, respectively, are increased or decreased nonlinearly.

In accordance with another aspect of the present invention, the pulse width control unit includes a pulse width determining unit for determining the pulse widths of the plurality of pulsed currents based on an initial value, a pulse width increment, and a plurality of correction coefficients that are predetermined for the plurality of heaters, respectively.

In accordance with a further aspect of the present invention, the pulsed-current supplying unit includes a DC power supply, a switching unit including a plurality of switches (referred to as first to nth switches from here on) each for generating a pulsed current from a DC output from the DC power supply in response to a control pulse applied thereto, and a control pulse generation unit for generating a control pulse to be supplied to the (i+1)th (i=1 to n−1) switch based on the pulsed current generated by the ith switch. Accordingly, the present invention offers an advantage of being able to prevent two adjacent heaters from being turned on at the same time and to ensure that a plurality of pulsed currents reach the plurality of heaters at different times, respectively. In addition, the present invention offers another advantage of being able to further reduce the load imposed on the DC power supply which is the source of the pulsed-current supplying unit and to downsize the EMI elimination filter which is used to eliminate switching noise included in the output of the DC power supply.

In accordance with another aspect of the present invention, the pulsed-current supplying unit includes a DC power supply, a switching unit including a plurality of switches (referred to as first to nth switches from here on) each for generating a pulsed current from a DC output from the DC power supply in response to a control pulse applied thereto, and a control pulse generation unit for generating a control pulse to be supplied to the (i+1)th (i=1 to n−1) switch based on a pulse which is delayed by a predetermined time interval with respect to a control pulse supplied to the ith switch.

In accordance with a further aspect of the present invention, there is provided an optical receiver comprising: a dispersion detector for detecting chromatic dispersion of an optical signal incident thereon, and for generating a control signal having a value corresponding to the detected chromatic dispersion; a tunable dispersion compensation device including an optical waveguide having a grating, a plurality of heaters arranged along an optical axis of the optical waveguide, and a pulsed-current supplying unit for producing a desired temperature distribution in the grating by supplying a plurality of pulsed currents to the plurality of heaters, respectively, according to the control signal from the dispersion detector; and an optical circulator for guiding the optical signal with chromatic dispersion to be compensated for to the dispersion compensation device, and for guiding the optical signal compensated by the dispersion compensation device to the dispersion detector. Accordingly, the tunable dispersion compensation device can quickly change the temperature distribution of the optical waveguide by changing the pulse widths of the plurality of pulsed currents supplied to the plurality of heaters, respectively, according to the chromatic dispersion detected by the dispersion detector, and therefore the optical receiver can achieve quick-response dynamic dispersion compensation.

In accordance with another aspect of the present invention, the pulsed-current supplying unit of the tunable dispersion compensation device includes a pulse width control unit for adjusting pulse widths of the plurality of pulsed currents supplied to the plurality of heaters, respectively, according to the desired temperature distribution to be produced in the grating.

In accordance with a further aspect of the present invention, the pulsed-current supplying unit of the tunable dispersion compensation device supplies the plurality of pulsed currents to the plurality of heaters at different times, respectively.

In accordance with another aspect of the present invention, there is provided an optical fiber communication system including an optical transmitter for multiplexing a plurality of optical signals having different wavelengths, an optical fiber transmission line via which the plurality of optical signals multiplexed by the optical transmitter are transmitted, an optical receiver for demultiplexing the plurality of optical signals multiplexed and received via the optical fiber transmission line and for demodulating information that the plurality of optical signals carry, and a tunable dispersion compensation unit for compensating for chromatic dispersion of each of the plurality of the optical signals transmitted via the optical fiber transmission line, the optical tunable dispersion compensation unit comprising: at least a tunable dispersion compensation device including an optical waveguide having a grating, a plurality of heaters arranged along an optical axis of the optical waveguide, and a pulsed-current supplying unit for producing a desired temperature distribution in the grating by supplying a plurality of pulsed currents to the plurality of heaters, respectively. Accordingly, the present invention offers an advantage of being able to efficiently, precisely, and dynamically compensate for residual chromatic dispersion in the optical fiber communication system and chromatic dispersion in the optical receiver.

In accordance with a further aspect of the present invention, the optical fiber communication system further comprises a static dispersion compensation unit coupled to the optical fiber transmission line, for compensating for a different, fixed amount of chromatic dispersion of each of the plurality of optical signals transmitted via the optical fiber transmission line.

In accordance with another aspect of the present invention, the optical tunable dispersion compensation unit includes a plurality of optical receiving unit disposed in the optical receiver, each for compensating for chromatic dispersion of a corresponding one of the plurality of optical signals demultiplexed, and each of the plurality of optical receiving unit comprises a dispersion detector for detecting chromatic dispersion of a corresponding one of the plurality of optical signals, and for generating a control signal having a value corresponding to the detected chromatic dispersion, a tunable dispersion compensation device including an optical waveguide having a grating, a plurality of heaters arranged along an optical axis of the optical waveguide, and a pulsed-current supplying unit for producing a desired temperature distribution in the grating by supplying a plurality of pulsed currents to the plurality of heaters, respectively, according to the control signal from the dispersion detector, and an optical circulator for guiding the optical signal with chromatic dispersion to be compensated for to the tunable dispersion compensation device, and for guiding the optical signal compensated by the tunable dispersion compensation device to the dispersion detector.

In accordance with a further aspect of the present invention, the pulsed-current supplying unit of the tunable dispersion compensation device has a pulse width control unit for adjusting pulse widths of the plurality of pulsed currents supplied to the plurality of heaters, respectively, according to the desired temperature distribution to be produced in the grating.

In accordance with another aspect of the present invention, the pulsed-current supplying unit supplies the plurality of pulsed currents to the plurality of heaters at different times, respectively.

In accordance with a further aspect of the present invention, there is provided a method of compensating for chromatic dispersion of an optical signal by using an optical waveguide having a grating, the method comprising the step of: producing a desired temperature distribution in the grating by supplying a plurality of pulsed currents to a plurality of heaters, respectively, the plurality of heaters being arranged along an optical axis of the optical waveguide.

In accordance with another aspect of the present invention, the method further comprises the steps of: detecting chromatic dispersion of the optical signal, generating a control signal having a value corresponding to the detected chromatic dispersion, and supplying a plurality of pulsed currents to the plurality of heaters, respectively, according to the control signal.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1.

Figure 1:
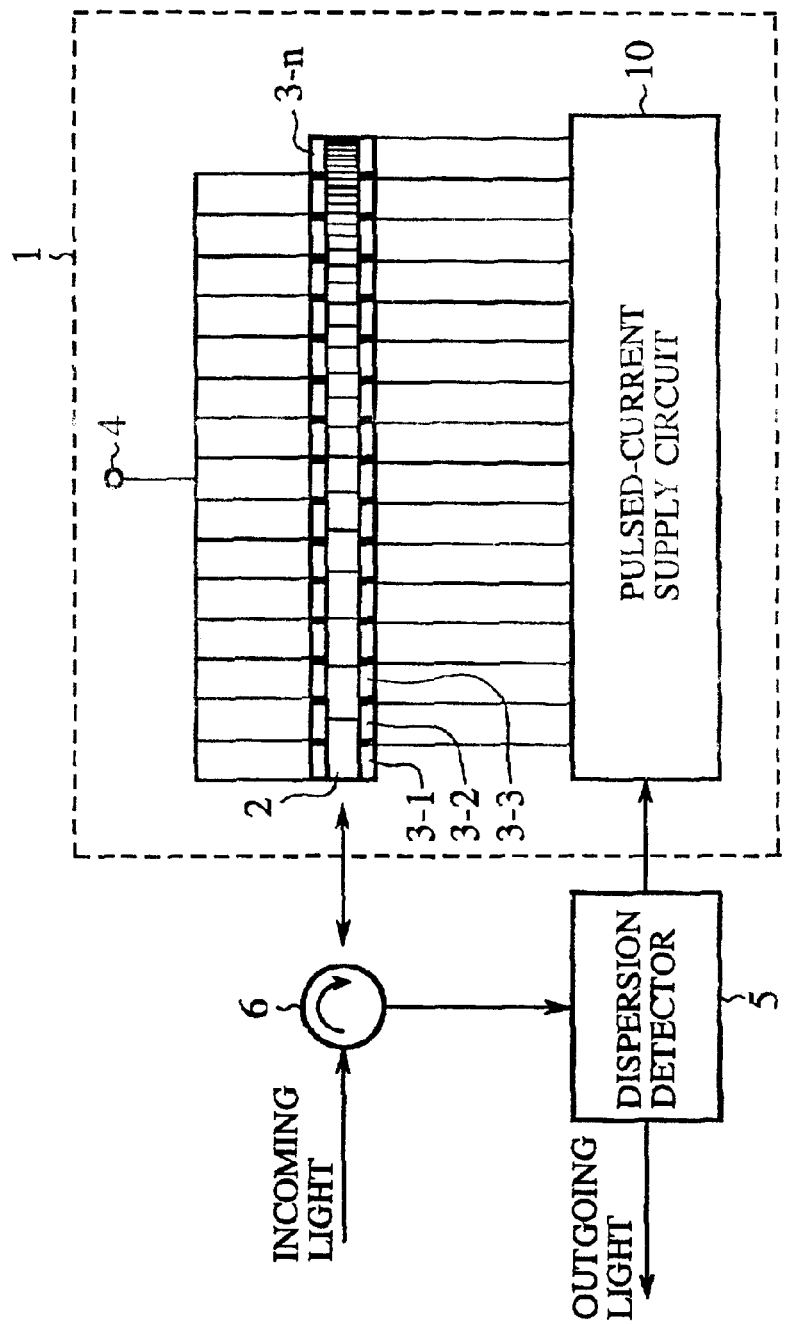
FIG. 1 is a block diagram showing the structure of a tunable dispersion compensation device according to a first embodiment of the present invention, and an optical receiver provided with the tunable dispersion compensation device.

FIG. 1 is a block diagram showing the structure of a tunable dispersion compensation device according to a first embodiment of the present invention, and an optical receiver provided with the tunable dispersion compensation device. In the figure, reference numeral 1 denotes the tunable dispersion compensation device, reference numeral 2 denotes an optical waveguide, such as an optical fiber, in which a chirped grating with a grating pitch that changes continuously along its optical axis is formed, reference numerals 3-1 to 3-$n$ denote a plurality of heaters, respectively, reference numeral 4 denotes a common ground terminal connected in common to the plurality of heaters 3-1 to 3-$n$, and reference numeral 10 denotes a pulsed-current supply circuit (pulsed-current supplying means) for supplying a plurality of pulsed currents to the plurality of heaters 3-1 to 3-$n$, respectively, so as to produce a desired temperature distribution (i.e., temperature gradient) along the length of the optical waveguide 2, i.e., in the direction of the optical axis of the optical waveguide 2.

Figure 2:
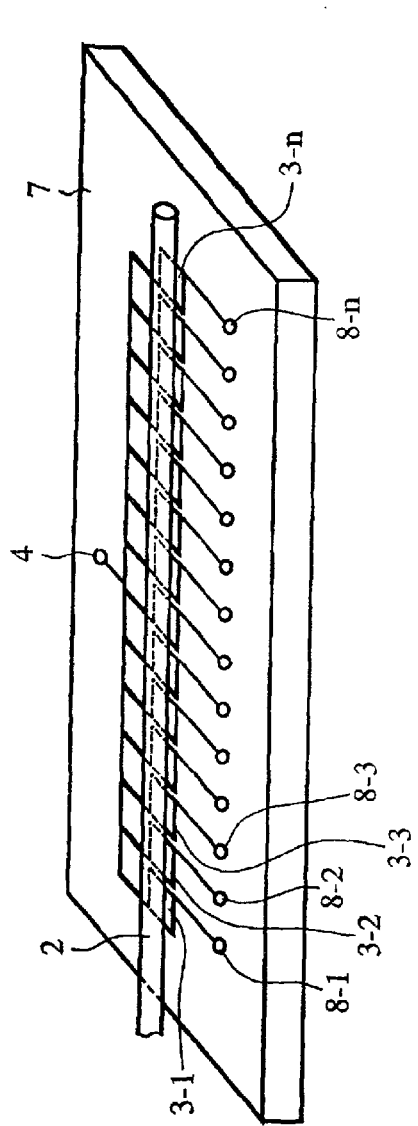
FIG. 2 is a perspective view showing an optical waveguide and a plurality of heaters included in the tunable dispersion compensation device according to the first embodiment shown in FIG. 1.

FIG. 2 is a perspective view showing the optical waveguide 2 and the plurality of heaters 3-1 to 3-$n$. Each of the plurality of heaters 3-1 to 3-$n$ consists of a metallic thin film made of nickel, tungsten, or the like. By depositing a metal such as nickel or tungsten on a substrate 7 made of an insulating material on which the optical waveguide 2 is placed, the plurality of heaters 3-1 to 3-$n$ are formed. As shown in FIG. 2, the optical waveguide 2 is installed on the substrate 7 so that the plurality of heaters 3-1 to 3-$n$ are arranged along the optical axis of the optical waveguide 2 in which a chirped grating is formed.

The pulsed-current supply circuit 10 generates a plurality of current pulses having different pulse widths based on a reference signal having a predetermined repetition rate, and then supplies the plurality of current pulses to the plurality of heaters 3-1 to 3-$n$, respectively, as described later. To this end, as shown in FIG. 2, a plurality of electrodes 8-1 to 8-$n$ are disposed to connect the pulsed-current supply circuit 10 as shown in FIG. 1 to ends of the plurality of heaters 3-1 to 3-$n$, the number of those electrodes being equal to the number of the plurality of heaters. On the other hand, as previously mentioned, the other ends of the plurality of heaters 3-1 to 3-$n$ are connected to the common ground terminal 4.

Furthermore, in FIG. 1, reference numeral 5 denotes a dispersion detector for detecting a physical value corresponding to the chromatic dispersion of an optical signal incident thereon, for sending out a control signal having a value which corresponds to the detected physical value to the pulsed-current supply circuit 10, and for delivering the optical signal incident thereon to a demodulation unit (not shown in the figure) for demodulating information which the optical signal carries, or the like, and reference numeral 6 denotes an optical circulator for guiding the optical signal which has propagated through an optical fiber transmission line (not shown in the figure) to the optical waveguide 2, and for guiding the optical signal emitted out of the optical waveguide 2 to the dispersion detector 5.

The tunable dispersion compensation device 1 according to the first embodiment of the present invention is provided with the optical waveguide 2, the plurality of heaters 3-1 to 3-$n$, the common ground terminal 4, and the pulsed-current supply circuit 10, and the optical receiver according to the first embodiment of the present invention is provided with the tunable dispersion compensation device 1, the dispersion detector 5, and the optical circulator 6.

Figure 3:
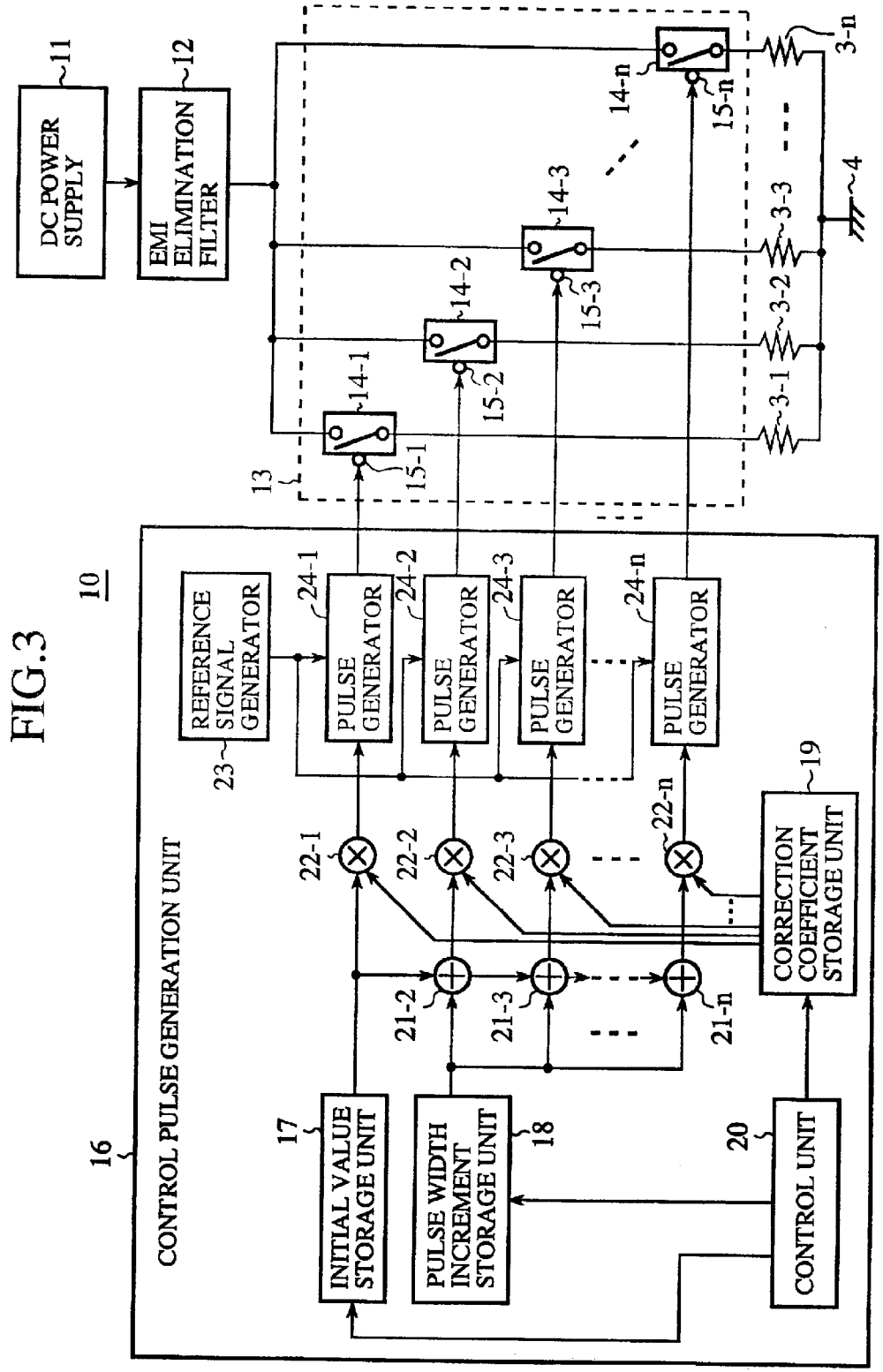
FIG. 3 is a block diagram showing the structure of a pulsed-current supply circuit of the tunable dispersion compensation device according to the first embodiment shown in FIG. 1.

FIG. 3 is a block diagram showing the structure of the pulsed-current supply circuit 10 of the tunable dispersion compensation device 1 according to the first embodiment of the present invention. In the figure, reference numeral 11 denotes a direct-current power supply for supplying a direct current to the plurality of heaters 3-1 to 3-$n$, reference numeral 12 denotes an EMI elimination filter for eliminating switching noise included in the direct current from the direct-current power supply 11, and reference numeral 13 denotes a pulsed current generation unit (switching means)

for generating a plurality of pulsed currents according to a plurality of control pulses applied thereto, and for supplying them to the plurality of heaters 3-1 to 3-n, respectively. The pulsed current generation unit 13 is provided with a plurality of switches 14-1 to 14-n respectively connected in series to the plurality of heater 3-1 to 3-n, which are connected in parallel with each other between the common ground terminal 4 and the EMI elimination filter 12. Each switch 14-i (i=1 to n) has a control terminal 15-i to receive a control pulse and is turned on only while it is receiving the control pulse. Therefore, each switch 14-i (i=1 to n) generates a pulsed current having a pulse width equal to that of the control pulse applied thereto and supplies the pulsed current to a corresponding heater 3-i. Concretely, each switch 14-i (i=1 to n) can be a switching device such as a transistor.

In FIG. 3, reference numeral 16 denotes a control pulse generation unit (pulse width control means) for generating a plurality of control pulses to be supplied to the pulsed current generation unit 13 to adjust the pulse widths of a plurality of pulsed currents to be generated by the pulsed current generation unit 13, reference numeral 17 denotes an initial value storage unit for storing an initial value $PW_0$ to determine the pulse width of one pulsed current having the smallest pulse width, reference numeral 18 denotes a pulse width increment storage unit for storing a pulse width increment $\Delta PW$ to determine the pulse widths of the plurality of pulsed currents in cooperation with the initial value $PW_0$, reference numeral 19 denotes a correction coefficient storage unit for storing a plurality of correction coefficients $C_1$ to $C_n$ to correct the pulse widths of the plurality of pulsed currents, which are determined based on the initial value $PW_0$ and the pulse width increment $\Delta PW$, respectively, and reference numeral 20 denotes a control unit, such as a microprocessor, for controlling the control pulse generation unit 16 according to a control signal applied thereto from the dispersion detector 5 of FIG. 1. The control unit 20 can determine the initial value $PW_0$, the pulse width increment $\Delta PW$, and the plurality of correction coefficients $C_1$ to $C_n$ according to the control signal from the dispersion detector 5, and can write the initial value $PW_0$, the pulse width increment $\Delta PW$, and the plurality of correction coefficients $C_1$ to $C_n$ into the initial value storage unit 17, the pulse width increment storage unit 18, and the correction coefficient storage unit 19, respectively.

Furthermore, reference numeral 21-2 denotes an adder for adding the initial value $PW_0$ stored in the initial value storage unit 17 to the pulse width increment $\Delta PW$ stored in the pulse width increment storage unit 18, and reference numeral 21-i (i=3 to n) denotes an adder for adding an addition result from another adder 21-(i−1) to the pulse width increment $\Delta PW$ stored in the pulse width increment storage unit 18. The adder 21-i (i=2 to n) therefore outputs ($PW_0 + \Delta PW \ast (i-1)$) as an addition result. In addition, reference numeral 22-1 denotes a multiplier for multiplying the initial value $PW_0$ stored in the initial value storage unit 17 by the correction coefficient $C_1$ stored in the correction coefficient storage unit 19, reference numeral 22-i (i=2 to n) denotes a multiplier for multiplying the addition result of the adder 21-i by the correction coefficient $C_i$ stored in the correction coefficient storage unit 19, reference numeral 23 denotes a reference signal generator for generating a reference signal having a predetermined repetition rate, and reference numeral 24-i (i=1 to n) denotes a pulse generator for generating a control pulse having a pulse width corresponding to a multiplication result of the multiplier 22-i based on the reference signal applied thereto from the reference signal generator 23. A pulse width determining means is implemented by the initial value storage unit 17, the pulse width increment storage unit 18, the correction coefficient storage unit 19, the control unit 20, the plurality of adders 21-2 to 21-n, and the plurality of multipliers 22-1 to 22-n. A correction means is implemented by the correction coefficient storage unit 19, the control unit 20, and the plurality of multipliers 22-1 to 22-n.

In operation, in an optical fiber communication system, as an optical signal propagates through an optical fiber, the pulse width of the optical signal is broadened due to the chromatic dispersion of the optical fiber, as already mentioned. For example, a normal optical fiber used for optical fiber communication systems provides abnormal dispersion (negative group velocity dispersion) for an optical signal of a wavelength of 1550 nm, the chromatic dispersion having a positive sign and being typically equal to about 17 ps/nm/km. If the optical fiber has a length of 100 km, the accumulated chromatic dispersion becomes about 1700 ps/nm. Therefore, in the case of use of the tunable dispersion compensation device 1, it is necessary to determine such accumulated chromatic dispersion, which should be compensated for, in advance. To this end, a physical value corresponding to the chromatic dispersion of an optical signal emitted out of the tunable dispersion compensation device 1 is measured by using the dispersion detector 5 shown in FIG. 1. Based on the determined physical value, a temperature distribution that has to be produced in the optical waveguide 2, i.e., the initial value $PW_0$, the pulse width increment $\Delta PW$, and the plurality of correction coefficients $C_1$ to $C_n$ are determined in advance. Concretely, the initial value $PW_0$, the pulse width increment $\Delta PW$, and the plurality of correction coefficients $C_1$ to $C_n$ are determined in advance so that the physical value corresponding to the chromatic dispersion, which is detected by using the dispersion detector 5, has a predetermined value (for example, a minimum value).

Figure 4:
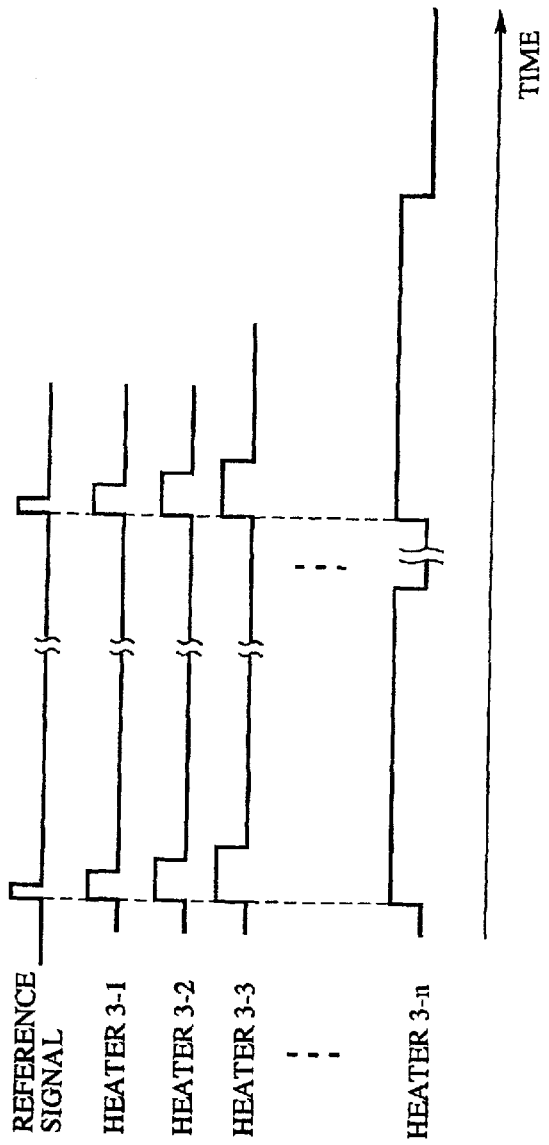
FIG. 4 is a timing chart showing the waveforms of a plurality of pulsed currents generated by the pulsed-current supply circuit when all of correction coefficients respectively set to a plurality of multipliers of the pulsed-current supply circuit shown in FIG. 3 are 1.

The temperature distribution which should be produced in the optical waveguide 2 only has to be linear when it can be considered that the chromatic dispersion to be compensated for does not depend on variations in the wavelengths of different spectral components in an optical signal incident on the optical waveguide (in other words, an optical signal having a narrow band of wavelengths, in which it can be assumed that different spectral components in the optical signal have different group delays and the sequence of group delays changes linearly with respect to light wavelength, is incident on the tunable dispersion compensation device 1). Therefore, in this case, the width of a control pulse which determines the pulse width of each of the plurality of pulsed currents is determined by the initial value $PW_0$ and the pulse width increment $\Delta PW$, and 1 is set to each multiplier 22-i as the correction coefficient Ci. FIG. 4 is a timing chart showing the waveforms of a plurality of pulsed currents generated by the pulsed-current supply circuit 10 when the correction coefficient $C_i$ set to each multiplier 22-i of the pulsed-current supply circuit 10 is 1. As shown in FIG. 4, typically, the pulsed-current supply circuit 10 of the tunable dispersion compensation device 1 according to the first embodiment simultaneously generates a plurality of pulsed currents to be supplied to the plurality of heaters 3-1, 3-2, . . . , and 3-n, respectively, the plurality of pulsed currents having an identical repetition rate and different pulse widths, and the sequence of pulse widths increasing linearly in order that the plurality of heaters 3-1, 3-2, . . . , and 3-n respectively associated with the plurality of pulsed currents are arranged along the optical axis of the optical waveguide 2. In this case, the rising edges of a plurality of control pulses which trigger the plurality of pulsed currents are all triggered by the rising edge of the reference signal generated by the reference signal generation unit 23 of the control pulse generation unit 16.

When the plurality of pulsed currents as shown in FIG. 4 are applied to the plurality of heaters 3-1 to 3-$n$, respectively, a distribution of temperature which increases linearly along the optical axis of the optical waveguide 2 with distance from an input/output end of the optical waveguide 2 is produced in the optical waveguide 2. In this case, the tunable dispersion compensation device 1 provides negative chromatic dispersion (group delay dispersion) for an optical signal incident thereon. In other words, the shorter wavelength a spectral component in the optical signal has, the larger delay the component has when emitted out of the input/output end of the tunable dispersion compensation device 1. As an alternative, the pulsed-current supply circuit 10 can simultaneously generate a plurality of pulsed currents to be supplied to the plurality of heaters 3-1, 3-2, . . . , and 3-$n$, respectively, the plurality of pulsed currents having an identical repetition rate and different pulse widths, and the sequence of pulse widths decreasing linearly in order that the plurality of heaters 3-1, 3-2, . . . , and 3-$n$ respectively associated with the plurality of pulsed currents are arranged along the optical axis of the optical waveguide 2. In this case, a distribution of temperature which decreases linearly along the optical axis of the optical waveguide 2 with distance from the input/output end of the optical waveguide 2 is produced in the optical waveguide 2.

However, in general, even if a plurality of pulsed currents having different pulse widths, the sequence of pulse widths increasing linearly as shown in FIG. 4, are supplied to the plurality of heaters 3-1 to 3-$n$, respectively, a desired linear temperature distribution cannot be produced because of heat conduction in the optical waveguide and so on. In this case, the correction coefficient $C_i$ having a value other than 1 is set to each multiplier 22-$i$. To determine the correction coefficient $C_i$, a real temperature distribution produced in the optical waveguide 2 is measured. Based on the measured temperature distribution, the correction coefficient $C_i$ having a value other than 1 can be set to every multiplier 22-$i$ which corresponds to a pulsed current whose pulse width needs to be corrected.

Figure 5:
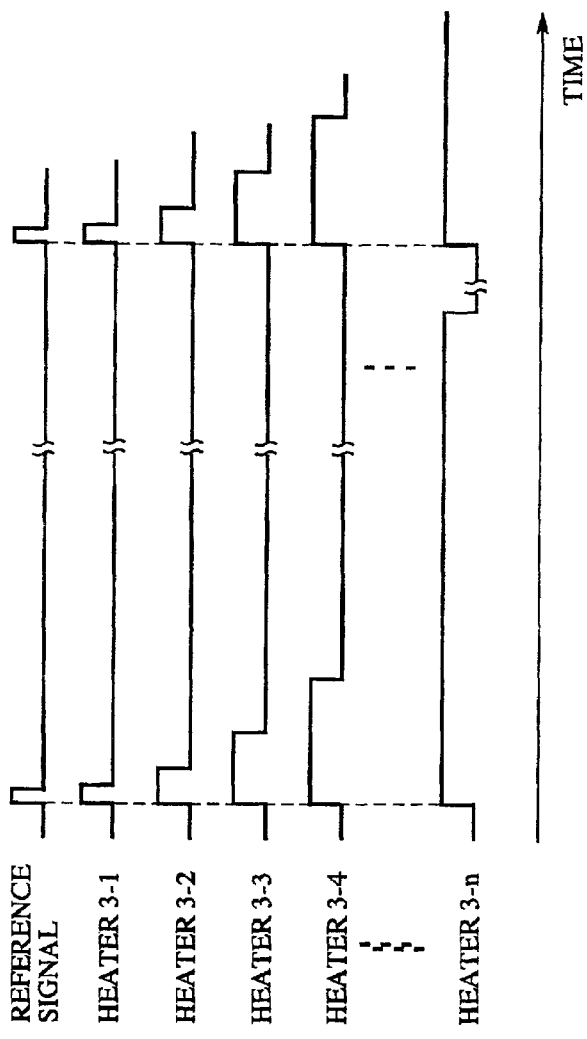
FIG. 5 is a timing chart showing the waveforms of a plurality of pulsed currents generated by the pulsed-current supply circuit when a correction coefficient set to each of the plurality of multipliers of the pulsed-current supply circuit shown in FIG. 3 is anything other than 1.

The temperature distribution which should be produced in the optical waveguide 2 has to be nonlinear when it can be considered that the chromatic dispersion to be compensated for depends on variations in the wavelengths of different spectral components in an optical signal incident on the optical waveguide (in other words, an optical signal having a broad band of wavelengths, in which it cannot be assumed that different spectral components in the optical signal have different group delays and the sequence of group delays changes linearly with respect to light wavelength, is incident on the tunable dispersion compensation device 1). The wavelength dependency of the chromatic dispersion can be figured by a straight line having a certain slope, and the slope for single mode fibers is typically 0.06 ps/(nm2·km). Therefore, every time an optical signal propagates through a 100 km length of such an optical fiber, two spectral components which differ by 1 nm in wavelength differ by only 6 ps/nm in the accumulated chromatic dispersion. In such a case, it is preferable to set the correction coefficient $C_i$ having a value other than 1 to each multiplier 22-$i$. FIG. 5 is a timing chart showing the waveforms of a plurality of pulsed currents generated by the pulsed-current supply circuit 10 when the correction coefficient $C_i$ set to each multiplier 22-$i$ of the pulsed-current supply circuit is anything other than 1.

By the way, the chirped grating does not necessarily have a grating pitch which is formed as designed. The grating pitch deviates from a desired value due to errors which occur when the chirped grating is written into the optical waveguide 2. Therefore, it is necessary to change the temperature distribution which should be produced in the optical waveguide 2 from an ideal linear one even if it can be considered that the chromatic dispersion which should be compensated for does not depend on variations in the wavelengths of different spectral components in an optical signal incident on the optical waveguide 2. In this case, the correction coefficient $C_i$ set to each multiplier 22-$i$ is determined in advance so that a physical value corresponding to the chromatic dispersion, which is detected by using the dispersion detector 5, has a predetermined value (for example, a minimum value).

Next, dynamic dispersion compensation by the optical receiver according to the first embodiment of the present invention will be explained. It is forecast that in 40 Gbit/s optical fiber communication systems there is a necessity to carry out dynamic dispersion compensation according to a little transition in the status of an optical fiber which is a transmission path. The optical receiver according to the first embodiment of the present invention can dynamically, easily compensate for chromatic dispersion in such a case. The dispersion detector 5 of FIG. 1 detects a physical value corresponding to the chromatic dispersion of an optical signal incident thereon at predetermined intervals, and then sends out a control signal having a value which corresponds to the detected physical value to the control pulse generation unit 16 of the pulsed-current supply circuit 10. The control unit 20 of the control pulse generation unit 16 determines whether to have to change the temperature distribution of the optical waveguide 2 according to the received control signal. When the control unit 20 determines that it is necessary to change the temperature distribution of the optical waveguide 2, the control unit 20 changes the initial value $PW_0$ stored in the initial value storage unit 17, the pulse width increment $\Delta PW$ stored in the pulse width increment storage unit 18, and the plurality of correction coefficients $C_1$ to $C_n$ stored in the correction coefficient storage unit 19. How the control unit 20 changes the initial value $PW_0$, the pulse width increment $\Delta PW$, and the plurality of correction coefficients $C_1$ to $C_n$ can be determined by experiment in advance.

Figure 6:
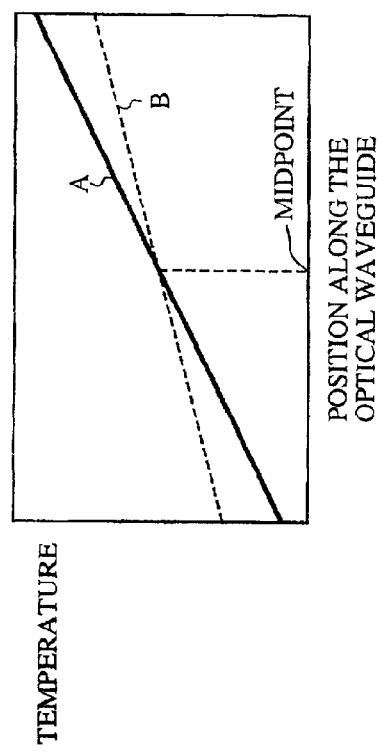
FIG. 6 is a diagram showing an example of a change in a temperature distribution in an optical waveguide included in the tunable dispersion compensation device according to the first embodiment of the present invention.

As a result, the pulse widths of a plurality of control pulses generated by the plurality of pulse generators 24-1 to 24-$n$ change, and therefore the pulse widths of the plurality of pulsed currents supplied to the plurality of heaters 3-1 to 3-$n$ change. Finally, the temperature distribution along the optical axis of the optical waveguide 2 is changed. Thus, the optical receiver can dynamically compensate for the chromatic dispersion of an optical signal incident thereon. FIG. 6 is a diagram showing an example of a change in the temperature distribution of the optical waveguide 2, which is performed according to a change in the chromatic dispersion which should be compensated for when it can be assumed that the chromatic dispersion does not depend on variations in the wavelengths of different spectral components in an optical signal incident on the optical waveguide, and the chromatic dispersion changes due to a change in the status of the optical fiber transmission line. The control unit 20 of the control pulse generation unit 16 changes the initial value $PW_0$, the pulse width increment $\Delta PW$, and the plurality of correction coefficients $C_1$ to $C_n$ so as to change the temperature distribution from A to B as shown in FIG. 6 while maintaining the temperature at the midpoint of the optical waveguide 2. The purpose of maintaining the temperature at the midpoint of the optical waveguide 2 when changing the temperature distribution is to constantly maintain the center of a range of wavelengths over which the tunable dispersion compensation device 1 can perform dispersion compensation. A method of controlling the temperature of the substrate 7 shown in FIG. 2 using a thermoelectric element or the like can be devised as a means to maintain the temperature at the midpoint of the optical waveguide 2.

The tunable dispersion compensation device 1 is so constructed as to provide positive chromatic dispersion for an optical signal incident thereon instead of negative chromatic dispersion when the chromatic dispersion (group delay dispersion) of the optical signal which should be compensated for is negative. In this case, the chirped grating is formed in the optical waveguide 2 of the tunable dispersion compensation device 1 so that the nearer to the input/output end of the optical waveguide 2, the shorter grating pitch and hence the shorter Bragg reflection wavelength the grating has. Therefore, the shorter wavelength a spectral component of the input optical signal has, it is reflected back at a location nearer to the input/output end of the optical waveguide 2 and then returns to the input/output end within the optical waveguide 2, and it is then emitted out of the input/output end. In other words, the longer wavelength a spectral component of the input optical signal has, the more distance from the input/output end of the optical waveguide 2 it reaches, and is then reflected back at a location where the Bragg reflection wavelength decided by the grating pitch is equal to the wavelength of the spectral component. As a result, the longer wavelength a spectral component in the optical signal has, the larger delay it has when emitted out of the tunable dispersion compensation device 1.

As mentioned above, in accordance with the first embodiment of the present invention, the tunable dispersion compensation device 1 is provided with a plurality of heaters 3-1 to 3-$n$ arranged along the optical axis of an optical waveguide 2, and a pulsed-current supplying circuit 10 for producing a desired temperature distribution in the optical waveguide 2 by generating and supplying a plurality of pulsed currents to the plurality of heaters 3-1 to 3-$n$, respectively, so as to cause the optical waveguide 2 in which a chirped grating is formed to dynamically compensate for the chromatic dispersion of an optical signal incident thereon, which can vary with time. Accordingly, the present embodiment offers an advantage of being able to perform dispersion compensation efficiently compared with the case of controlling the resistance of a resistor connected in series to each of the plurality of heaters. In addition, since the optical receiver provided with the tunable dispersion compensation device 1 can quickly change the temperature distribution of the optical waveguide 2 by changing the pulse widths of a plurality of pulsed currents supplied to the plurality of heaters 3-1 to 3-$n$, respectively, according to the chromatic dispersion detected by a dispersion detector 5, the optical receiver can achieve quick-response dynamic dispersion compensation.

Embodiment 2.

Figure 7:
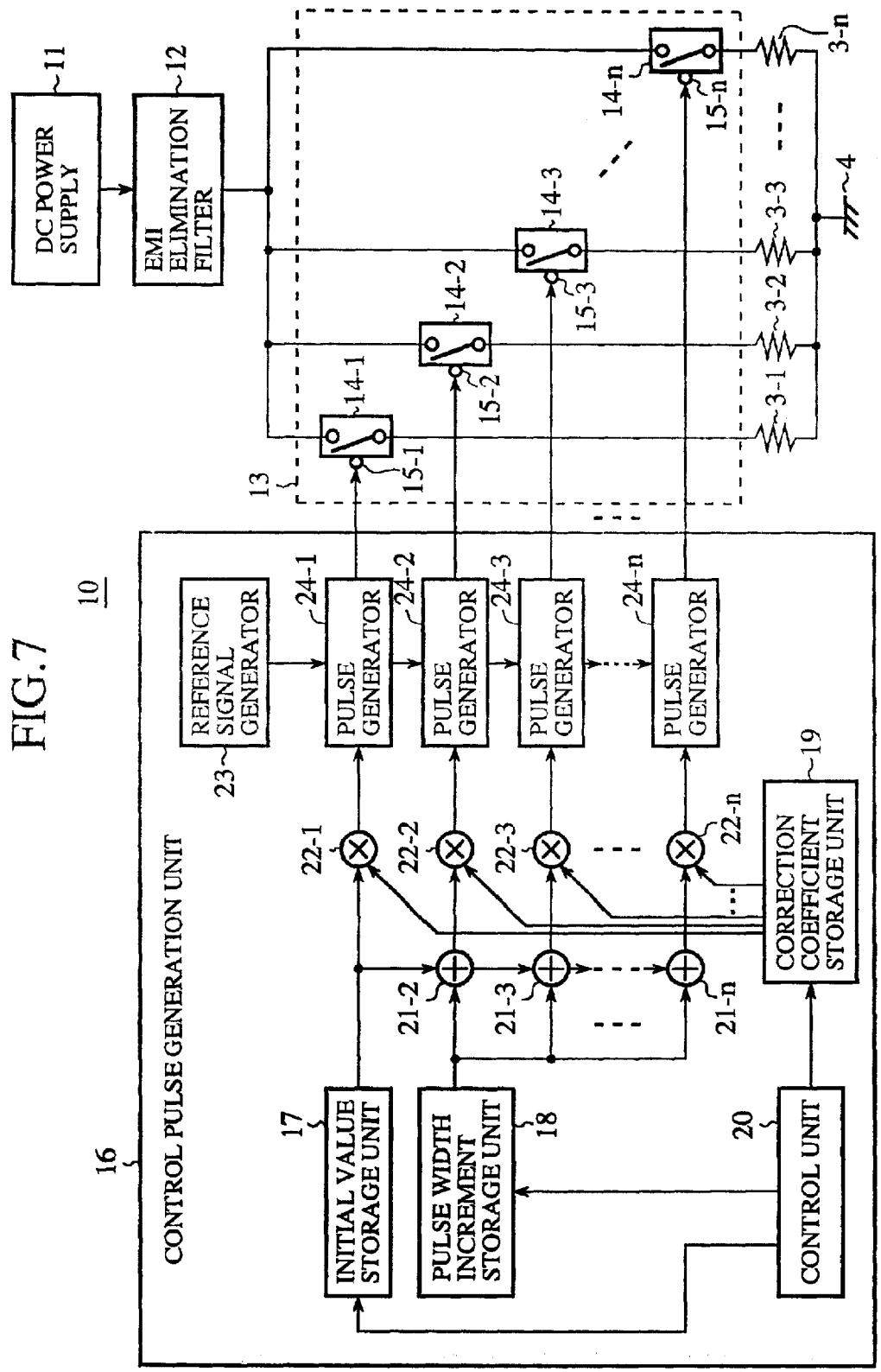
FIG. 7 is a block diagram showing the structure of a pulsed-current supply circuit of a tunable dispersion compensation device according to a second embodiment of the present invention.

FIG. 7 is a block diagram showing the structure of a pulsed-current supply circuit 10 of a tunable dispersion compensation device according to a second embodiment of the present invention. In the figure, the same reference numerals as shown in FIG. 3 denote the same components as those of the pulsed-current supply circuit according to the above-mentioned first embodiment of the present invention or like components, and therefore the explanation of those components will be omitted hereafter.

In accordance with the second embodiment of the present invention, the pulsed-current supply circuit 10 is so constructed as to generate and supply a plurality of pulsed currents to a plurality of heaters 3-1 to 3-$n$, respectively, so that they reach the plurality of heaters 3-1 to 3-$n$ at different times, respectively. The tunable dispersion compensation device according to the second embodiment of the present invention and an optical receiver provided with the tunable dispersion compensation device have the same structures as those according to the above-mentioned first embodiment of the present invention.

As shown in FIG. 7, a reference signal generator 23 for generating a reference signal having a predetermined repetition rate is connected to a pulse generator 24-1 for generating a control pulse to determine the pulse width of a pulsed current to be supplied to the heater 3-1 nearest to an input/output end of an optical waveguide 2. Therefore, the pulse generator 24-1 generates a control pulse in response to the rising edge of the reference signal applied thereto. A pulse generator 24-$i$ ($i$=1 to $n-1$) is connected to another pulse generator 24-($i$+1) adjacent thereto. Therefore, the pulse generator 24-$i$ ($i$=2 to n) adjacent to another pulse generator 24-($i-1$) generates a control pulse in response to the falling edge of every control pulse applied thereto.

Since the tunable dispersion compensation device and the optical receiver according to the second embodiment of the present invention operate basically in the same way that those according to the above-mentioned first embodiment of the present invention do, only a difference between the first and second embodiments will be explained hereafter.

Figure 8:
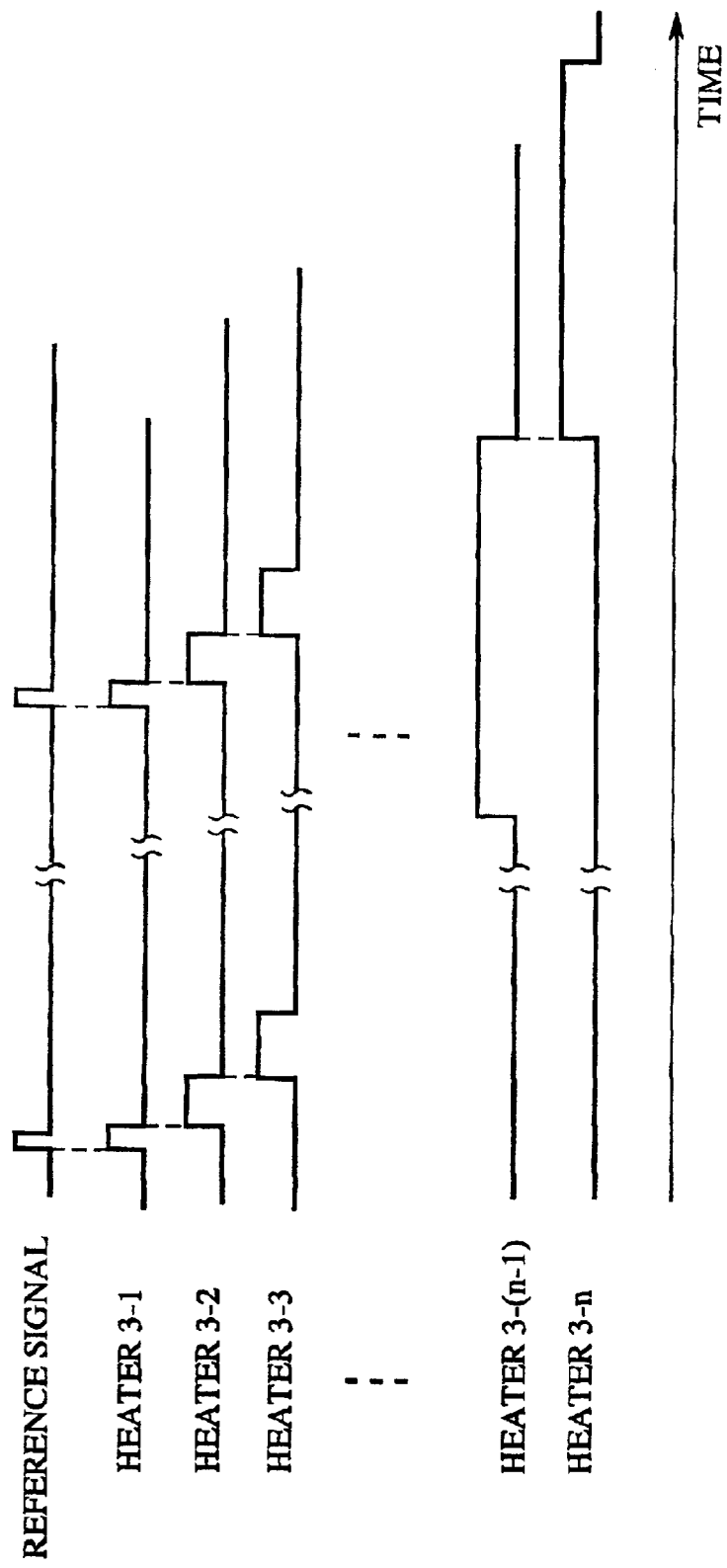
FIG. 8 is a timing chart showing the waveforms of a plurality of pulsed currents generated by the pulsed-current supply circuit when all of correction coefficients respectively set to a plurality of multipliers of the pulsed-current supply circuit shown in FIG. 7 are 1.

FIG. 8 is a timing chart showing the waveforms of a plurality of pulsed currents generated by the pulsed-current supply circuit 10 when a correction coefficient $C_i$ set to each multiplier 22-$i$ of the pulsed-current supply circuit is 1. As shown in FIG. 8, the pulsed-current supply circuit 10 of the tunable dispersion compensation device 1 according to the second embodiment of the present invention typically generates a plurality of pulsed currents to be supplied to the plurality of heaters 3-1, 3-2, . . . , and 3-$n$, respectively, at different times, the plurality of pulsed currents having an identical repetition rate and different pulse widths, and the sequence of pulse widths increasing linearly in order that the plurality of heaters 3-1, 3-2, . . . , and 3-$n$ respectively associated with the plurality of pulsed currents are arranged along the optical axis of the optical waveguide 2. Therefore, the plurality of pulsed currents generated reach the plurality of heaters 3-1 to 3-$n$ at different times, respectively. In this case, the rising edge of every control pulse to determine the pulse width of every pulsed current to be supplied to the heater 3-1 nearest to the input/output end of the optical waveguide 2 is triggered by the rising edge of the reference signal generated by the reference signal generation unit 23, as previously mentioned. The rising edge of every control pulse to determine the pulse width of every pulsed current to be supplied to the heater 3-$i$ ($i$=2 to n) is triggered by the falling edge of every control pulse to determine the pulse width of every pulsed current to be supplied to the heater 3-($i-1$).

It is needless to say that in accordance with the second embodiment of the present invention the correction coefficient $C_1$ can be anything other than 1, for the purpose of correcting a deviation from a desired linear temperature distribution in the optical waveguide, producing a nonlinear temperature distribution in the optical waveguide, or correcting a deviation from a desired temperature distribution in the optical waveguide due to errors in the grating pitch of a chirped grating formed in the optical waveguide.

As mentioned above, in accordance with the second embodiment of the present invention, since the tunable dispersion compensation device 1 is provided with a pulsed-current supply circuit 10 that generates and supplies a plurality of pulsed currents to a plurality of heaters 3-1 to 3-n, respectively, so that they reach the plurality of heaters 3-1 to 3-n at different times, respectively, the tunable dispersion compensation device 1 can reduce the peak value of an electric current which flows from the pulsed-current supply circuit 10 to the plurality of heater 3-1 to 3-n compared with that of the above-mentioned first embodiment of the present invention. Therefore, the second embodiment offers an advantage of being able to reduce the load imposed on a direct-current power supply 11 which is an electrical power supply source of the plurality of heaters and to downsize an EMI elimination filter 12 which is used to eliminate switching noise included in the output of the direct-current power supply.

Embodiment 3.

Figure 9:
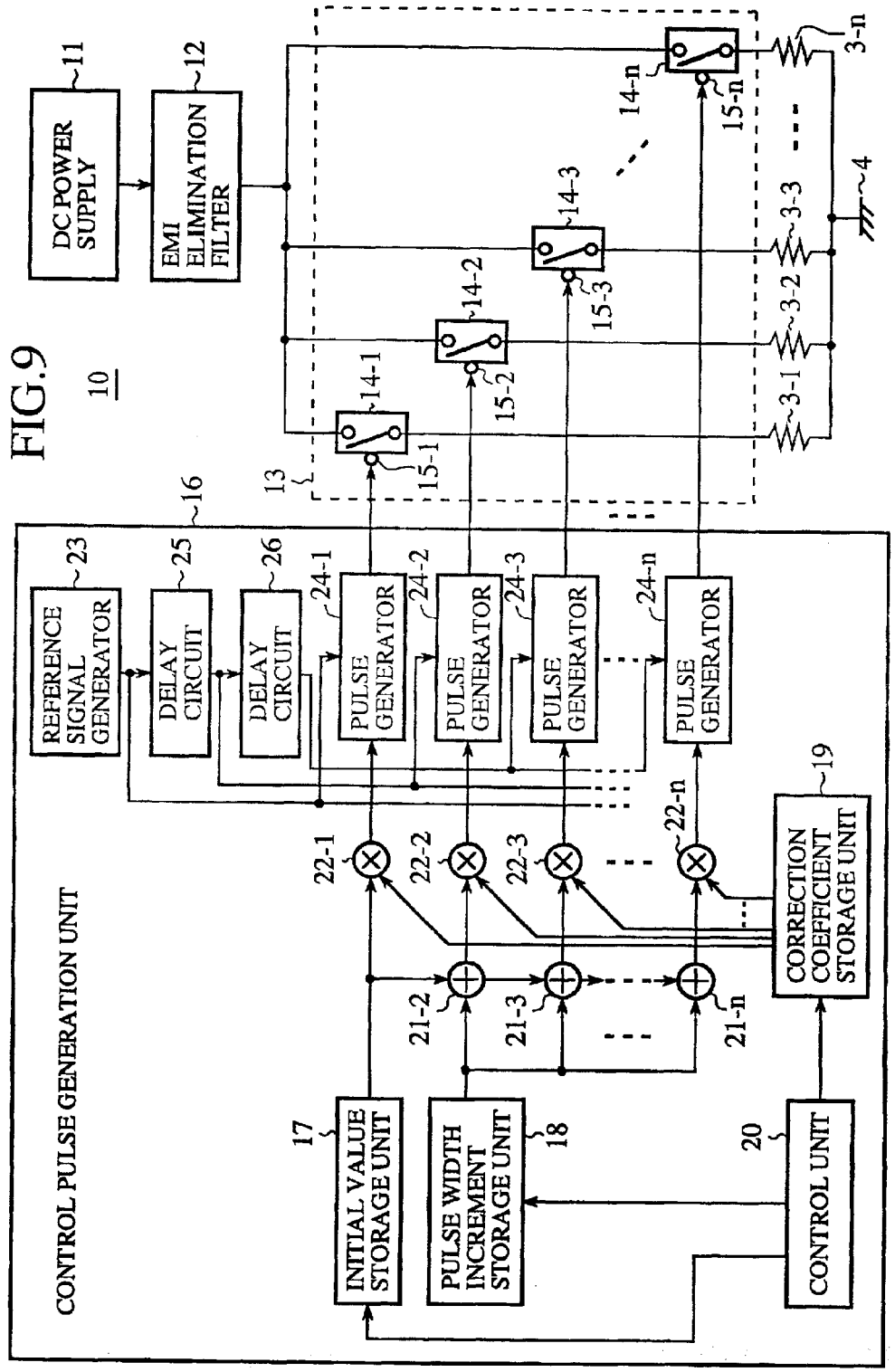
FIG. 9 is a block diagram showing the structure of a pulsed-current supply circuit of a tunable dispersion compensation device according to a third embodiment of the present invention.

FIG. 9 is a block diagram showing the structure of a pulsed-current supply circuit 10 of a tunable dispersion compensation device according to a third embodiment of the present invention. In the figure, the same reference numerals as shown in FIG. 3 denote the same components as those of the pulsed-current supply circuit according to the above-mentioned first embodiment of the present invention or like components, and therefore the explanation of those components will be omitted hereafter. Furthermore, in FIG. 9, reference numeral 25 denotes a first delay circuit for delaying a reference signal generated by a reference signal generator 23 by a predetermined time interval, and for outputting the delayed reference signal, and reference numeral 26 denotes a second delay circuit for delaying the output of the first delay circuit 25 by a predetermined time interval, and for outputting the delayed output.

In accordance with the third embodiment of the present invention, a plurality of heaters 3-1 to 3-n are divided into a plurality of groups (three groups in the example shown in FIG. 9), and the pulsed-current supply circuit 10 generates and supplies a plurality of pulsed currents to the plurality of heaters 3-1 to 3-n, respectively, so that pulsed currents, which are included in different groups, respectively, reach corresponding heaters at different times, respectively. The tunable dispersion compensation device according to the third embodiment of the present invention and an optical receiver provided with the tunable dispersion compensation device have the same structures as those according to the above-mentioned first embodiment.

As shown in FIG. 9, the reference signal generator 23 for generating a reference signal having a predetermined repetition rate is connected to a plurality of pulse generators 24-1, 24-4, 24-7, . . . . Therefore, these pulse generators generate control pulses in response to the rising edge of the reference signal applied thereto, respectively. Furthermore, the first delay circuit 25 for delaying the reference signal by a predetermined time interval is connected to a plurality of pulse generators 24-2, 24-5, 24-8, . . . . Therefore, these pulse generators generate control pulses in response to the rising edge of the output of the first delay circuit 25, respectively. In addition, the second delay circuit 26 for delaying the output of the first delay circuit 25 by a predetermined time interval is connected to a plurality of pulse generators 24-3, 24-6, 24-9, . . . . Therefore, these pulse generators generate control pulses in response to the rising edge of the output of the second delay circuit 26, respectively.

Since the tunable dispersion compensation device and the optical receiver according to the third embodiment of the present invention operate basically in the same way that those according to the above-mentioned first embodiment do, only a difference between the first and third embodiments will be explained hereafter. A case where the plurality of heaters 3-1 to 3-n are divided into three groups will be illustrated hereafter.

Figure 10:
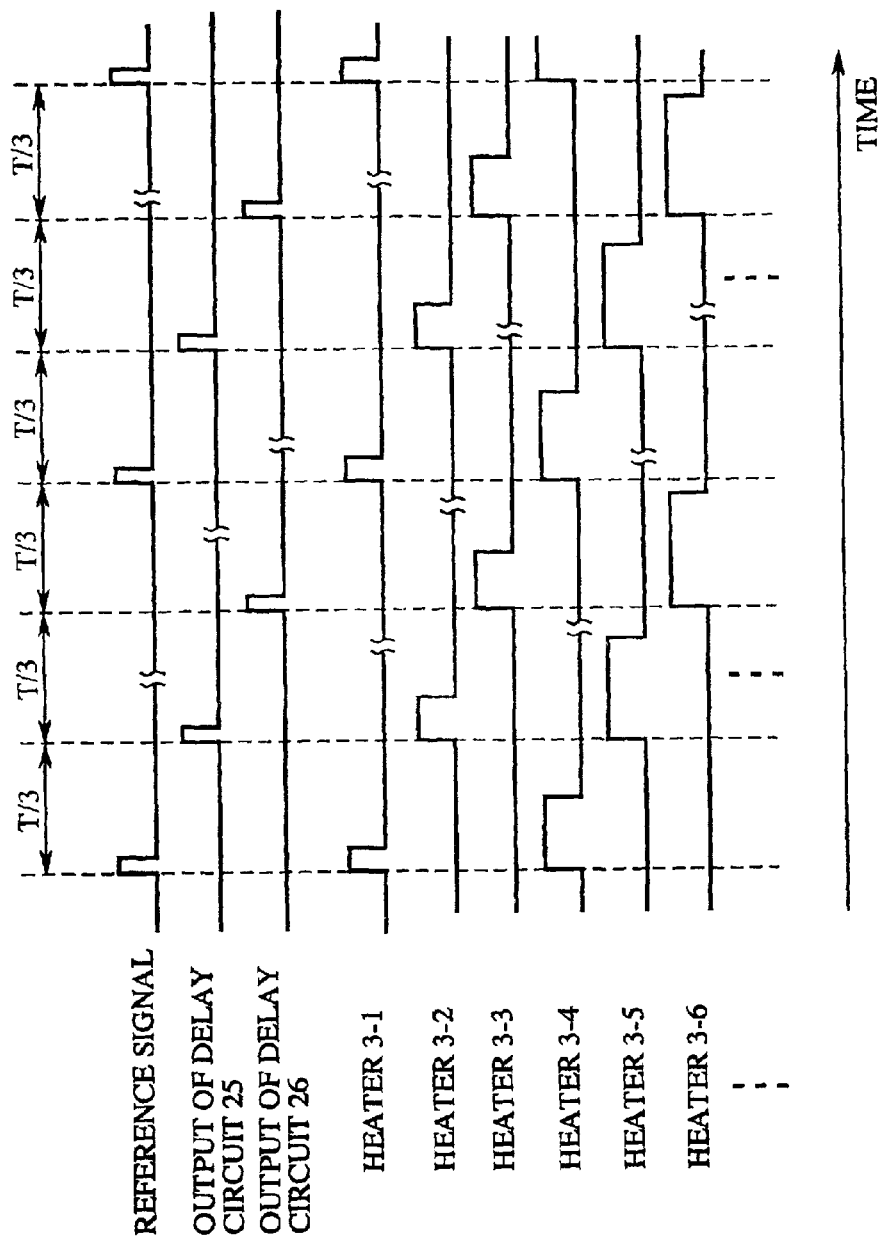
FIG. 10 is a timing chart showing the waveforms of a plurality of pulsed currents generated by the pulsed-current supply circuit when all of correction coefficients respectively set to a plurality of multipliers of the pulsed-current supply circuit shown in FIG. 9 are 1.

Each of the first and second delay circuits 25 and 26 delays an input signal applied thereto by a predetermined time interval equal to ⅓ of the repetition period T of the reference signal output from the reference signal generator 23, and outputs the delayed input signal. FIG. 10 is a timing chart showing the waveforms of a plurality of pulsed currents generated by the pulsed-current supply circuit 10 in this case, and shows an example in the case where a correction coefficient $C_1$ set to each multiplier 22-$i$ is 1. As shown in FIG. 10, the pulsed-current supply circuit 10 of the tunable dispersion compensation device according to the third embodiment of the present invention divides a plurality of pulsed currents into three groups, and generates and supplies the plurality of pulsed currents to the plurality of heaters 3-1, 3-2, . . . , and 3-n, respectively, so that the plurality of groups reach corresponding heaters at different times, the plurality of pulsed currents having an identical repetition rate and different pulse widths, and the sequence of pulse widths increasing linearly in order that the plurality of heaters 3-1, 3-2, . . . , and 3-n respectively associated with the plurality of pulsed currents are arranged along the optical axis of an optical waveguide in which a chirped grating is formed. In this case, the rising edge of every control pulse to determine the pulse width of every pulsed current to be supplied to each of the heaters 3-1, 3-4, 3-7, . . . is triggered by the rising edge of the reference signal generated by the reference signal generation unit 23, as previously mentioned. The rising edge of every control pulse to determine the pulse width of every pulsed current to be supplied to each of the heaters 3-2, 3-5, 3-8, . . . is triggered by the rising edge of the output of the first delay circuit 25 which is delayed against the reference signal by T/3, as previously mentioned. The rising edge of every control pulse to determine the pulse width of every pulsed current to be supplied to each of the heaters 3-3, 3-6, 3-9, . . . is triggered by the rising edge of the output of the second delay circuit 26 which is delayed against the output of the first delay circuit 25 by T/3 (i.e., against the reference signal by 2T/3), as previously mentioned.

It is needless to say that in accordance with the third embodiment of the present invention the correction coefficient $C_i$ can be anything other than 1, for the purpose of correcting a deviation from a desired linear temperature distribution in the optical waveguide, producing a nonlinear temperature distribution in the optical waveguide, or correcting a deviation from a desired temperature distribution in the optical waveguide due to errors in the grating pitch of a chirped grating formed in the optical waveguide.

As mentioned above, in accordance with the third embodiment of the present invention, the tunable dispersion compensation device 1 is provided with a pulsed-current supply circuit 10 that divides the plurality of pulsed currents into three groups, and supplies a plurality of pulsed currents to the plurality of heaters 3-1, 3-2, . . . , and 3-n, respectively, so that the plurality of groups reach corresponding heaters at different times, the tunable dispersion compensation device 1 can reduce the peak value of an electric current which flows from the pulsed-current supply circuit 10 to the plurality of heater 3-1 to 3-n compared with that of the above-mentioned first embodiment, like that of the above-mentioned second embodiment. Therefore, the third embodiment offers an advantage of being able to reduce the load imposed on a direct-current power supply 11 which is an electrical power supply source of the plurality of heaters and to downsize an EMI elimination filter 12 which is used to eliminate switching noise included in the output of the direct-current power supply. Though the larger the number of division of the plurality of pulsed currents into a plurality of groups, the more the peak value of the circuit current can be reduced, it is preferable that the number of division is small in consideration of controllability. Therefore, it is preferable that the number of division is reduced to a minimum one required to cause the peak value of the circuit current to has a desired value.

Embodiment 4.

Figure 11:
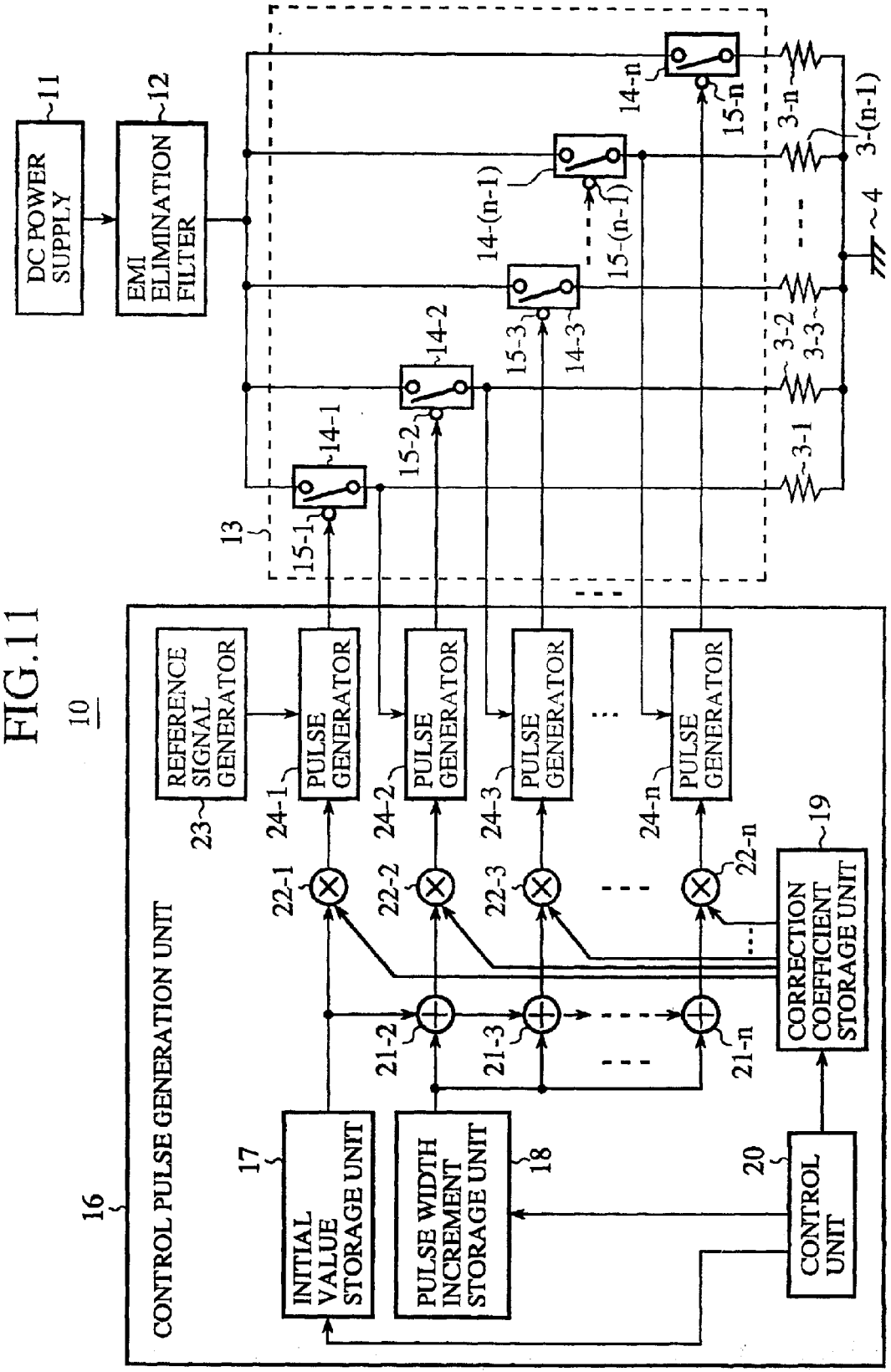
FIG. 11 is a block diagram showing the structure of a pulsed-current supply circuit of a tunable dispersion compensation device according to a fourth embodiment of the present invention.

FIG. 11 is a block diagram showing the structure of a pulsed-current supply circuit 10 of a tunable dispersion compensation device according to a fourth embodiment of the present invention. In the figure, the same reference numerals as shown in FIG. 7 denote the same components as those of the pulsed-current supply circuit according to the above-mentioned second embodiment of the present invention or like components, and therefore the explanation of those components will be omitted hereafter.

Figure 12:
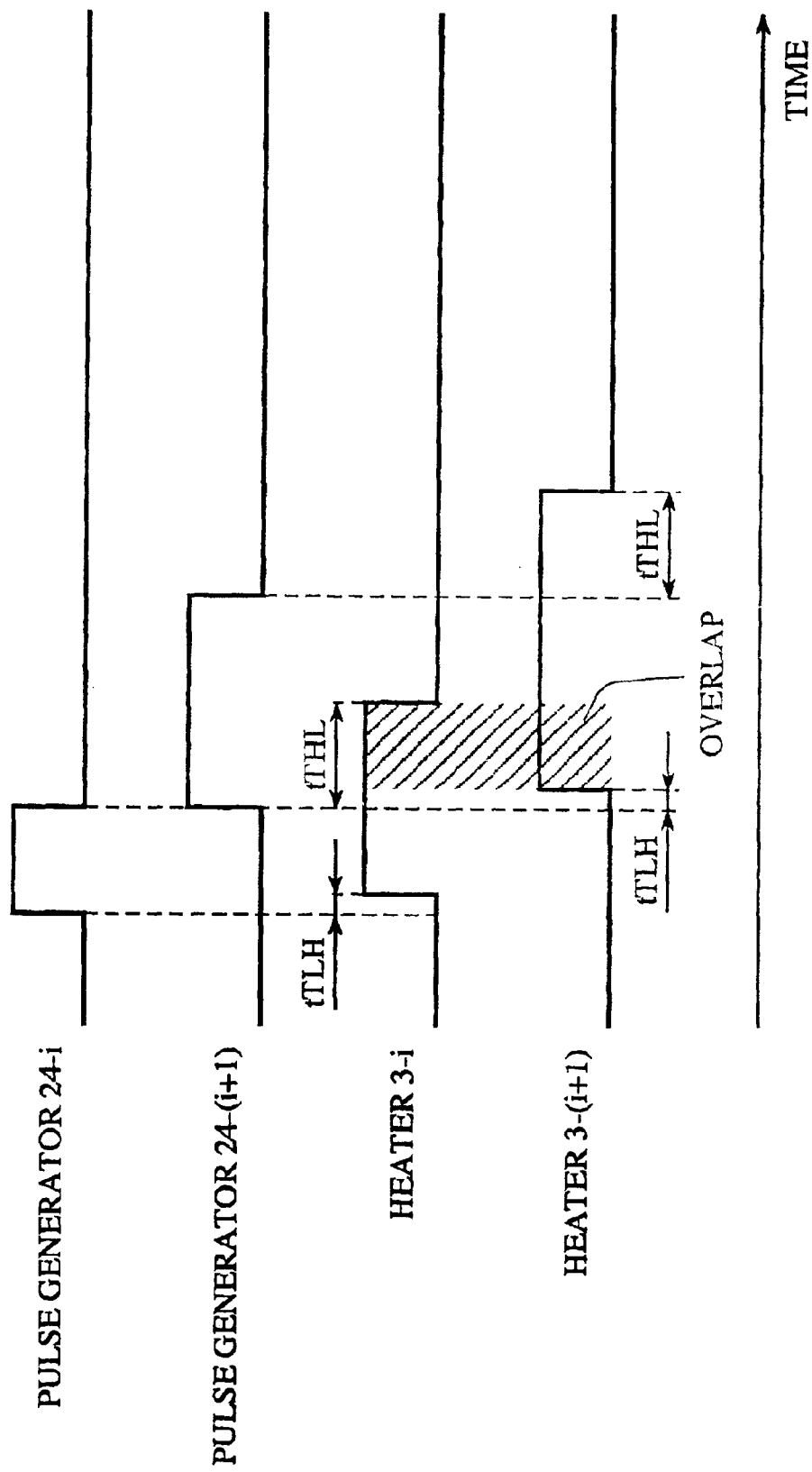
FIG. 12 is a timing chart showing an overlap between two pulsed currents which are supplied to two adjacent heaters by the pulsed-current supply circuit of the tunable dispersion compensation device according to the second embodiment of the present invention.

While the pulsed-current supply circuit 10 according to the above-mentioned second embodiment is so constructed as to supply a plurality of pulsed currents to a plurality of heaters 3-1 to 3-*n*, respectively so that the plurality of generated pulsed currents reach the plurality of heaters 3-1 to 3-*n* at different times, respectively, each switch 14-*i* (ith (i=1 to n) switch) of a pulsed-current generation unit 13 actually has a delay characteristic and requires a certain time delay when turned on and off, as shown in FIG. 12. A pulsed current supplied to a corresponding heater 3-*i* has a rising edge that lags a predetermined pulse rise time tTLH behind the rising edge of a control pulse from a pulse generator 24-*i*, and has a falling edge that lags a predetermined pulse fall time tTHL behind the falling edge of the control pulse from the pulse generator 24-*i*. In addition, since the pulse fall time tTHL is usually longer than the pulse rise time tTLH, two pulsed currents supplied to two adjacent heaters 3-*i* and 3-(i+1) (i=1 to n−1) are not completely shifted in time from each other and they overlap one another. In other words, there is a time period during which the two adjacent heaters 3-*i* and 3-(i+1) are turned on at the same time. As a result, the pulsed-current supply circuit 10 according to the above-mentioned second embodiment has a drawback that the peak value of the circuit current increases.

In contrast, the pulsed-current supply circuit 10 according to the fourth embodiment has a control pulse generation unit (control pulse generation means) 16 that is so constructed as to generate a control pulse to be supplied to the (i+1) th switch 14-(i+1) (i=1 to n−1) based on the pulsed current generated by the ith switch 14-*i*. Concretely, as shown in FIG. 11, a reference signal generator 23 for generating a reference signal of a predetermined repetition frequency has an output terminal connected to a control terminal of the pulse generator 24-1 that generates a control pulse to determine the pulse width of the pulsed current supplied to the heater 3-1 which is nearest to the input/output end of an optical waveguide 2, and the ith switch 14-*i* (i=1 to n−1) has an output terminal connected to a control terminal of a pulse generator 24-(i+1). As a result, the pulse generator 24-1 generates a control pulse in response to the rising edge of the reference signal applied thereto and then supplies it to the switch 14-1. The pulse generator 24-(i+1) (i=1 to n−1) generates a control pulse in response to the falling edge of the pulsed current generated by the ith switch 14-*i* to and then supplies it to the (i+1)th switch 14-(i+1). The tunable dispersion compensation device according to the fourth embodiment of the present invention and an optical receiver provided with the tunable dispersion compensation device have the same structures as those according to the above-mentioned first embodiment.

Since the tunable dispersion compensation device and the optical receiver according to the fourth embodiment of the present invention operate basically in the same way that those according to the above-mentioned second embodiment do, only a difference between the second and fourth embodiments will be explained hereafter.

Figure 13:
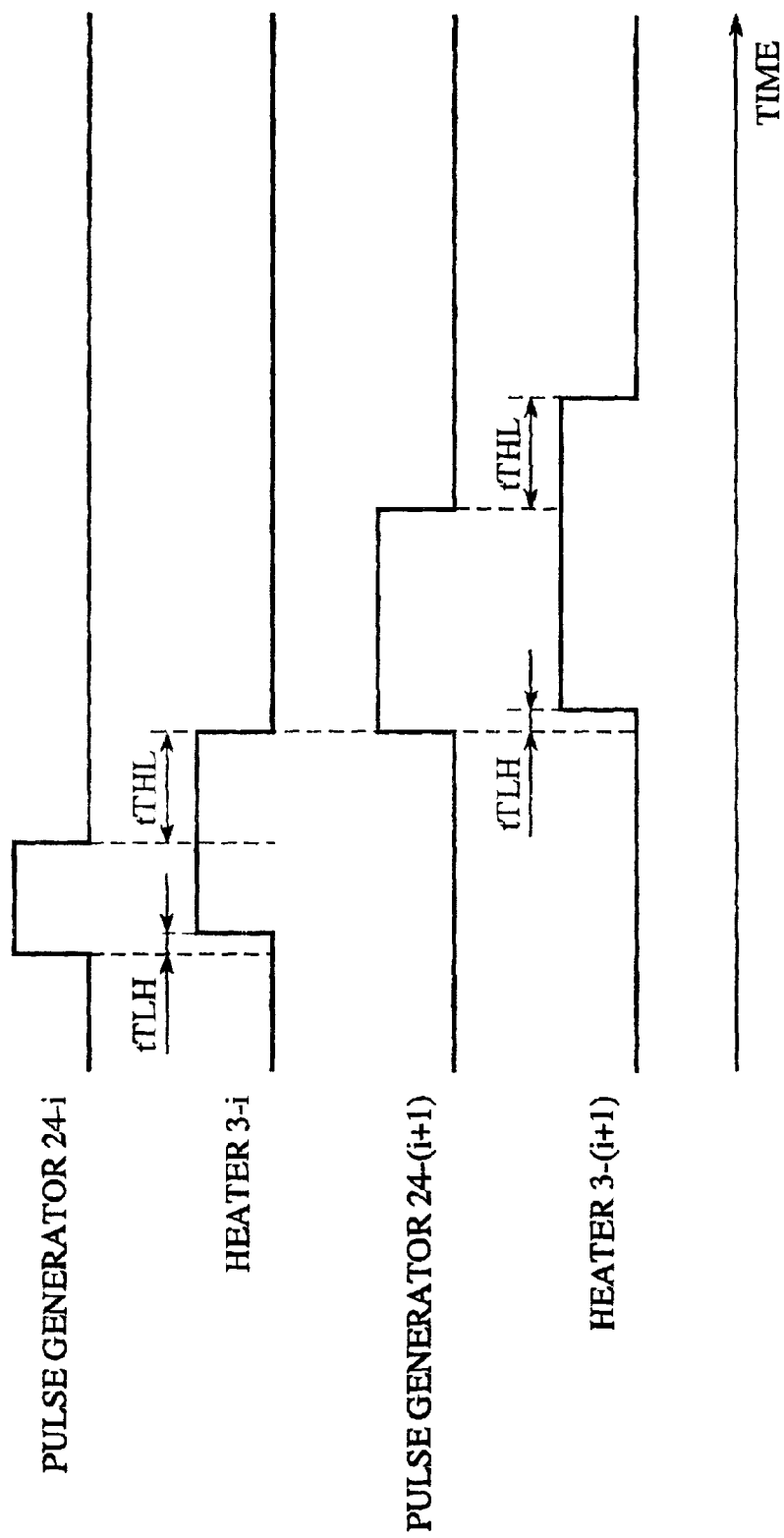
FIG. 13 is a timing chart showing a relationship between control pulses and pulsed currents generated by the pulsed-current supply circuit of the tunable dispersion compensation device according to the fourth embodiment of the present invention.

FIG. 13 is a timing chart showing a relationship between control pulses generated by the two adjacent pulse generators 24-*i* and 24-(i+1) (i=1 to n−1) of the pulsed-current supply circuit 10 and pulsed currents supplied to the two corresponding heaters 3-*i* and 3-(i+1). As shown in FIG. 13, the rising edge of the control pulse which determines the pulse width of the pulsed current supplied to the heater 3-(i+1) (i=1 to n−1) is triggered by the falling edge of the pulsed current supplied from the ith switch 14-*i* to the heater 3-*i*. In other words, the pulse generator 24-(i+1) (i=1 to n−1) generates a control pulse in response to the falling edge of the pulsed current which is generated by the ith switch 14-*i* and is supplied to the heater 3-*i*, and then supplies the control pulse to the (i+1) th switch 14-(i+1). As a result, as shown in FIG. 13, a time lag, which corresponds to tTLH, is caused in the falling edge of the pulsed current supplied to the heater 3-*i* (i=1 to n−1) and in the rising edge of the pulsed current supplied to the heater 3-(i+1).

As mentioned above, in accordance with the fourth embodiment of the present invention, since the tunable dispersion compensation device 1 is provided with the pulsed-current supply circuit 10 that is so constructed as to generate a control pulse to be supplied to the (i+1)th switch 14-(i+1) (i=1 to n−1) based on the pulsed current generated by the ith switch 14-*i*, the fourth embodiment can prevent two adjacent heaters 3-*i* and 3-(i+1) (i=1 to n−1) from being turned on at the same time and can ensure that a plurality of pulsed currents reach the plurality of heaters 3-1 to 3-*n* at different times, respectively. Accordingly, the tunable dispersion compensation device 1 can reduce the peak value of an electric current which flows from the pulsed-current supply circuit 10 to the plurality of heaters 3-1 to 3-*n* compared with that of the above-mentioned second embodiment. Therefore, the fourth embodiment offers an advantage of being able to reduce the load imposed on a direct-current power supply 11 which is an electrical power supply source of the plurality of heaters and to downsize an EMI elimination filter 12 which is used to eliminate switching noise included in the output of the direct-current power supply.

Embodiment 5.

Figure 14:
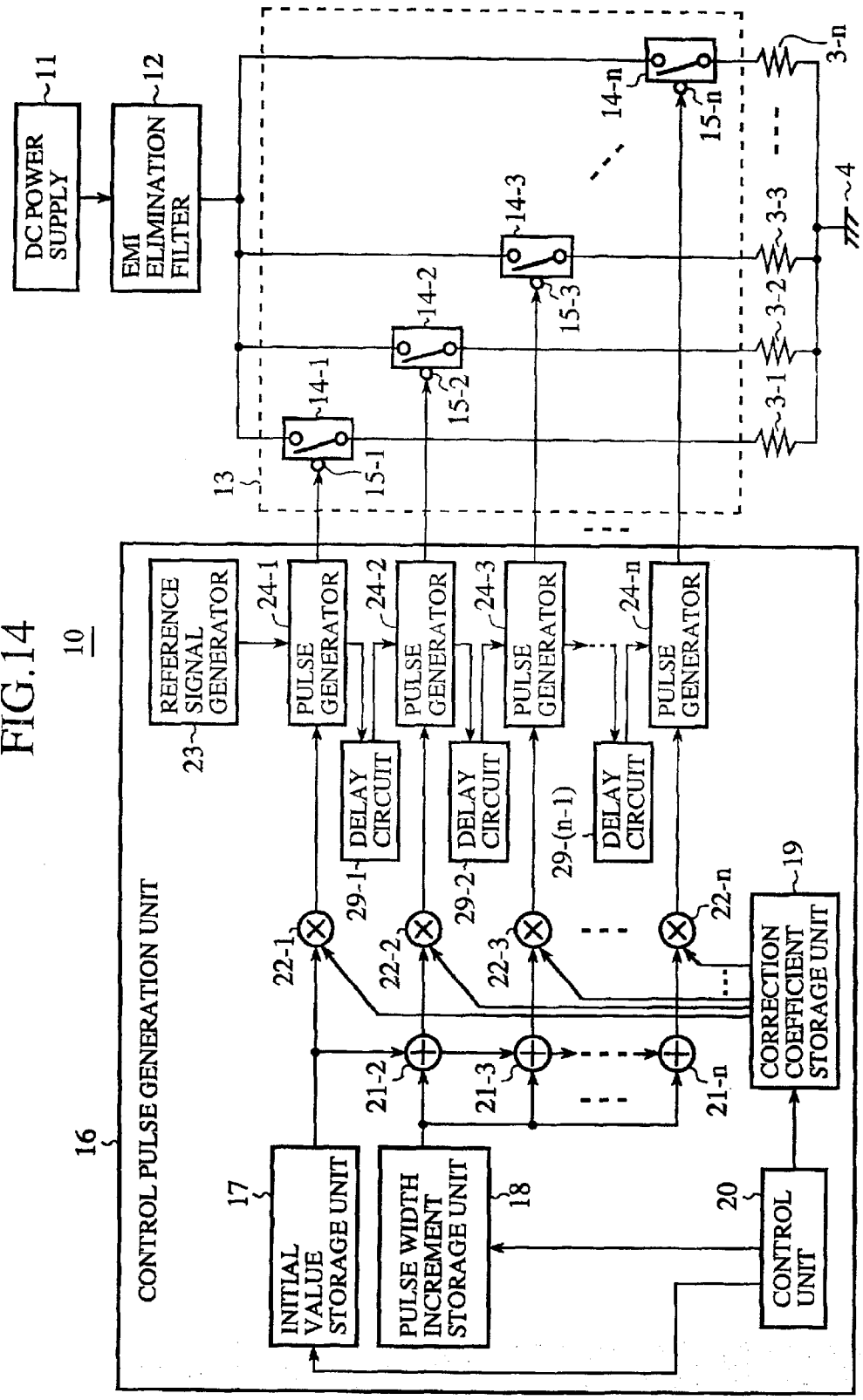
FIG. 14 is a block diagram showing the structure of a pulsed-current supply circuit of a tunable dispersion compensation device according to a fifth embodiment of the present invention.

FIG. 14 is a block diagram showing the structure of a pulsed-current supply circuit 10 of a tunable dispersion compensation device according to a fifth embodiment of the present invention. In the figure, the same reference numerals as shown in FIG. 7 denote the same components as those of the pulsed-current supply circuit according to the above-mentioned second embodiment of the present invention or like components, and therefore the explanation of those components will be omitted hereafter. Furthermore, in FIG. 14, reference numeral 29-*i* (i=1 to n−1) denotes a delay circuit for delaying a control pulse generated by a pulse generator 24-*i* and for applying the delayed control pulse to another pulse generator 24-(i+1).

As previously mentioned, in the above-mentioned second embodiment, two pulsed currents supplied to two adjacent heaters 3-*i* and 3-(i+1) (i=1 to n−1) are not completely shifted in time from each other and they overlap one another. In other words, there is a time period during which the two adjacent heaters 3-$i$ and 3-($i$+1) are turned on at the same time. As a result, the pulsed-current supply circuit 10 according to the above-mentioned second embodiment has a drawback that the peak value of the circuit current increases.

In contrast, the pulsed-current supply circuit 10 according to the fifth embodiment has a control pulse generation unit 16 that is so constructed as to generate a control pulse to be supplied to a switch 14-($i$+1) ($i$=1 to n−1) based on a control pulse which has been supplied to another switch 14-$i$ and has been delayed by a predetermined time interval. Concretely, as shown in FIG. 14, a reference signal generator 23 for generating a reference signal of a predetermined repetition frequency has an output terminal connected to a control terminal of a pulse generator 24-1 that generates a control pulse to determine the pulse width of a pulsed current to be supplied to a heater 3-1 which is nearest to the input/output end of an optical waveguide 2, and a pulse generator 24-$i$ ($i$=1 to n−1) has an output terminal connected, by way of the delay circuit 29-$i$, to a control terminal of another pulse generator 24-($i$+1). As a result, the pulse generator 24-1 generates a control pulse in response to the rising edge of the reference signal applied thereto and then supplies the control pulse to the switch 14-1. In addition, the pulse generator 24-($i$+1) ($i$=1 to n−1) generates a control pulse in response to the falling edge of the control pulse which has been generated by the pulse generator 24-$i$ and has been delayed by the delay circuit 29-$i$ and then supplies the control pulse to the switch 14-($i$+1). The tunable dispersion compensation device according to the fifth embodiment of the present invention and an optical receiver provided with the tunable dispersion compensation device have the same structures as those according to the above-mentioned first embodiment.

Since the tunable dispersion compensation device and the optical receiver according to the fifth embodiment of the present invention operate basically in the same way that those according to the above-mentioned second embodiment do, only a difference between the second and fourth embodiments will be explained hereafter.

Figure 15:
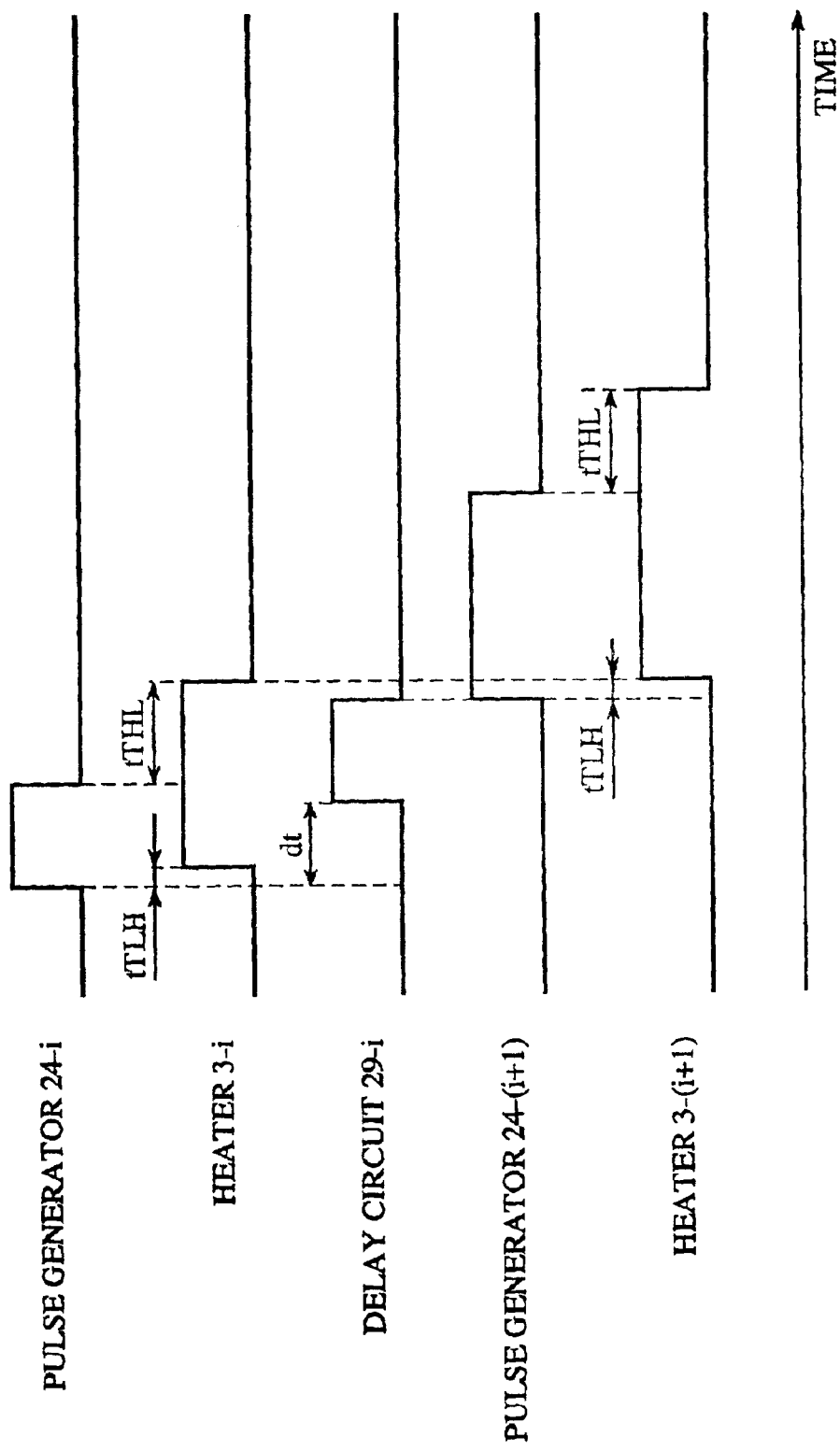
FIG. 15 is a timing chart showing a relationship between control pulses and pulsed currents generated by the pulsed-current supply circuit of the tunable dispersion compensation device according to the fifth embodiment of the present invention.

FIG. 15 is a timing chart showing a relationship between control pulses generated by the two adjacent pulse generators 24-$i$ and 24-($i$+1) ($i$=1 to n−1) of the pulsed-current supply circuit 10 and pulsed currents supplied to the two corresponding heaters 3-$i$ and 3-($i$+1). As shown in FIG. 15, the rising edge of a control pulse which determines the pulse width of the pulsed current supplied to the heater 3-($i$+1) ($i$=1 to n−1) is triggered by the falling edge of a control pulse which has been supplied from the pulse generator 24-$i$ to the ith switch 14-$i$ and which has been delayed by a predetermined time interval dt. In other words, the pulse generator 24-($i$+1) ($i$=1 to n−1) generates a control pulse in response to the falling edge of the control pulse generated by the pulse generator 24-$i$ and delayed by the delay circuit 29-$i$, and then supplies the control pulse to the ($i$+1)th switch 14-($i$+1). As a result, the overlap between two pulsed currents supplied to two adjacent heaters 3-$i$ and 3-($i$+1) ($i$=1 to n−1) is canceled, as shown in FIG. 15, by setting the time delay dt to be equal to or greater than the difference between the predetermined pulse fall time tTHL and the predetermined pulse rise time tTLH which are described in the above-mentioned fourth embodiment.

Since each switch 14-$i$ of a pulsed-current generation unit 13 does not necessarily have the same delay characteristic and the predetermined pulse fall time tTHL and the predetermined pulse rise time tTLH vary among the plurality of switches, the delay circuit 29-$i$ can be so constructed as to change the time delay that is provided for the control pulse from the pulse generator 24-$i$. In addition, a control unit 20 can change this time delay.

As mentioned above, in accordance with the fifth embodiment, since the tunable dispersion compensation device 1 is provided with the pulsed-current supply circuit 10 that is so constructed as to generate a control pulse to be supplied to the ($i$+1)th switch 14-($i$+1) ($i$=1−n−1) based on a control pulse which has been supplied to the ith switch 14-$i$ and has been delayed by a predetermined time interval, the fifth embodiment can prevent two adjacent heaters 3-$i$ and 3-($i$+1) ($i$=1 to n−1) from being turned on at the same time and can ensure that a plurality of pulsed currents reach the plurality of heaters 3-1 to 3-$n$ at different times, respectively. Accordingly, the tunable dispersion compensation device 1 can reduce the peak value of an electric current which flows from the pulsed-current supply circuit 10 to the plurality of heater 3-1 to 3-$n$ compared with that of the above-mentioned second embodiment. Therefore, the fifth embodiment offers an advantage of being able to reduce the load imposed on a direct-current power supply 11 which is an electrical power supply source of the plurality of heaters and to downsize an EMI elimination filter 12 which is used to eliminate switching noise included in the output of the direct-current power supply.

Embodiment 6.

Figure 16:
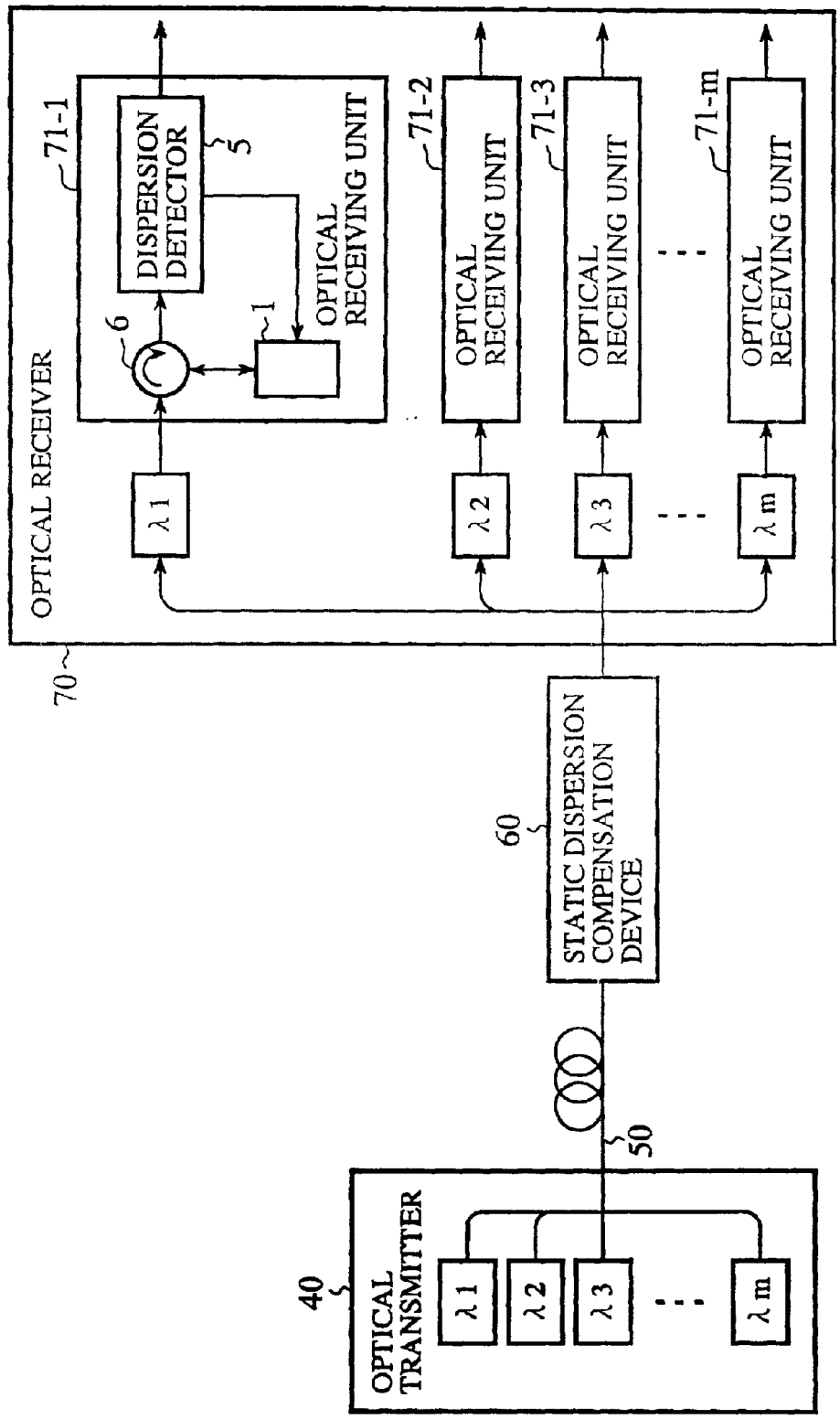
FIG. 16 is a block diagram schematically showing the structure of an optical fiber communication system according to a sixth embodiment of the present invention.
Figure 17:
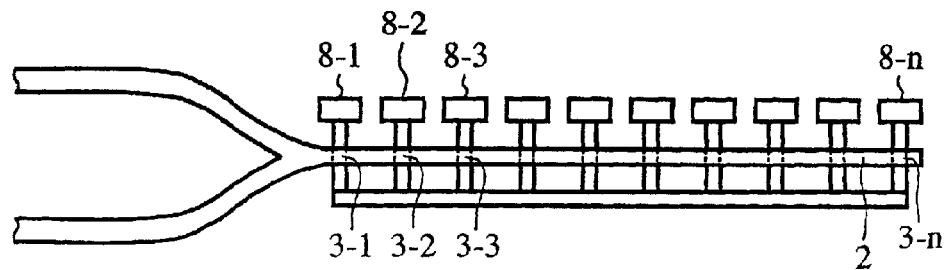
FIG. 17 is a view showing the structure of a prior art tunable dispersion compensation device.
Figure 18:
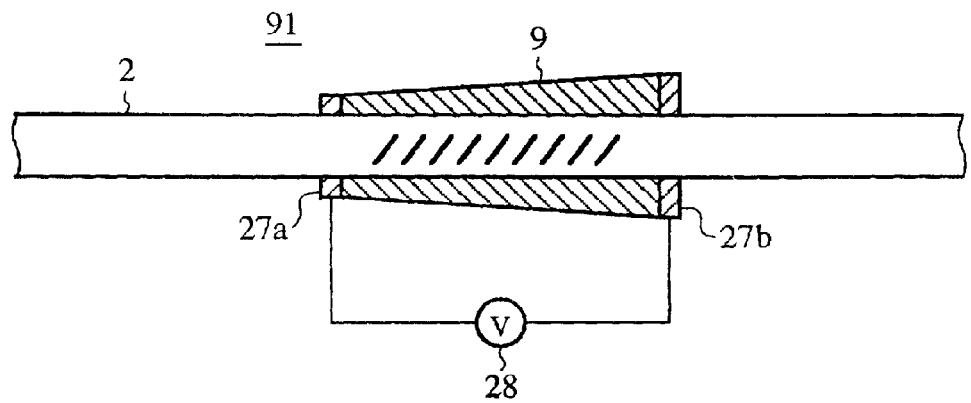
FIG. 18 is a view showing the structure of another prior art tunable dispersion compensation device.
Figure 19:
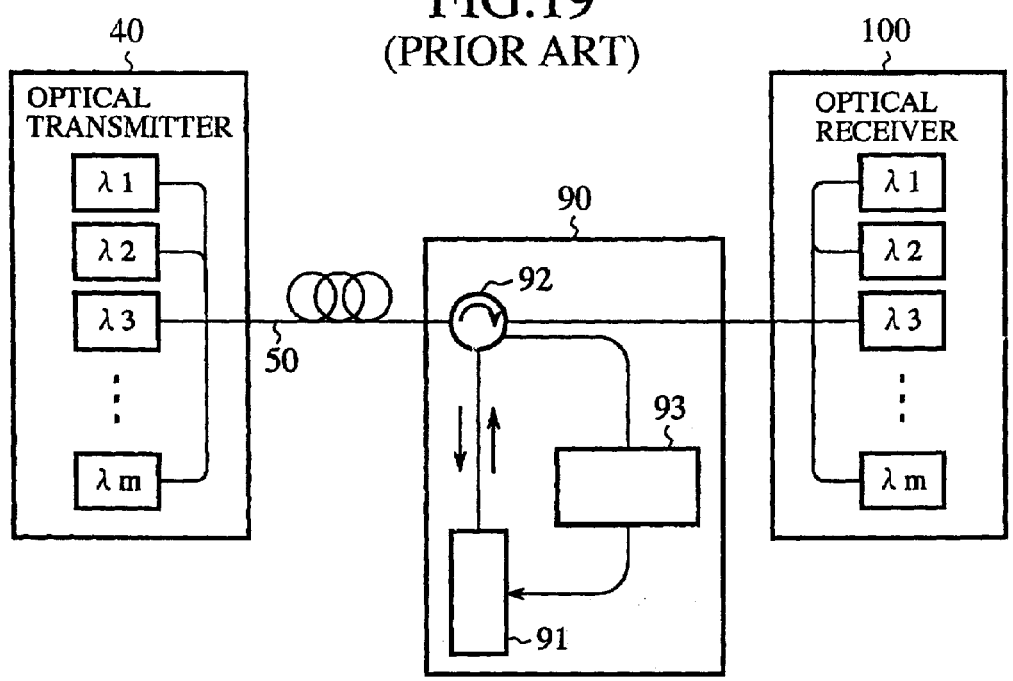
FIG. 19 is a diagram schematically showing the structure of an optical fiber communication system including the tunable dispersion compensation device shown in FIG. 18.

FIG. 16 is a block diagram schematically showing the structure of an optical fiber communication system according to a sixth embodiment of the present invention. In the figure, reference numeral 40 denotes an optical transmitter for multiplexing and transmitting a plurality of optical signals of different wavelengths, each of which carries information, reference numeral 50 denotes an optical fiber transmission line which is typically a single mode fiber via which optical signals are transmitted, reference numeral 60 denotes a static dispersion compensator (static dispersion compensation means) coupled to the optical fiber transmission line 50, for compensating for different, constant chromatic dispersion of each of the plurality of optical signals transmitted by way of the optical fiber transmission line 50, reference numeral 70 denotes an optical receiver for receiving a plurality of multiplexed optical signals with chromatic dispersion, which has not been compensated for completely by the static dispersion compensator 60, and for demultiplexing the multiplexed optical signals into the plurality of optical signals so as to demodulate information which each of the plurality of optical signals carries, and reference numerals 71-1 to 71-$m$ denotes a plurality of optical receiving units (optical receiving means) disposed in the optical receiver 70, respectively, each of the plurality of optical receiving units having the same structure as the optical receiver according to any one of the above-mentioned first through fifth embodiments, and having a tunable dispersion compensation device 1 for dynamically compensating for chromatic dispersion including residual dispersion of a corresponding one of the plurality of optical signals demultiplexed, a dispersion detector 5, and an optical circulator 6. Well-known optical amplifiers and so on are not shown in FIG. 16. In accordance with the sixth embodiment, a tunable dispersion compensation means is implemented by the plurality of optical receiving units 71-1 to 71-$m$.

Typically, the optical fiber communication system according to the sixth embodiment of the present invention can be a WDM system of 40 Gbit/s or more which multiplexes several tens of optical signals of different wavelengths and transmits them. However, the optical fiber communication system of the present invention is not limited to such a WDM system.

As previously mentioned, the optical fiber transmission line 50, which is a single mode fiber, can provide abnormal dispersion (negative group velocity dispersion) for an optical signal of a wavelength of 1550 nm, the chromatic dispersion being typically equal to about 17 ps/nm/km. In other words, spectral components of shorter wavelengths included in an optical signal propagate through the optical fiber transmission line 50 faster than other spectral components of longer wavelengths, and if the optical fiber transmission line 50 has a length of 100 km the accumulated chromatic dispersion can be about 1700 ps/nm. Therefore, for example, the pulse width of an optical signal having a spectral width of 1 nm will increase by about 1700 ps every time the optical signal propagates through a 100 km length of the optical fiber transmission line 50.

The static dispersion compensator 60 is disposed to roughly compensate for the chromatic dispersion in the optical fiber transmission line 50, and typically includes one or more dispersion compensation fibers. A typical dispersion compensation fiber can produce chromatic dispersion of about −100 ps/nm/km. For example, one dispersion compensation fiber for compensating for chromatic dispersion of about 1700 ps can be disposed for every 100 km length of the optical fiber transmission line 50. On the other hand, the chromatic dispersion of an optical fiber depends on the wavelengths of spectral components in light that propagates through the optical fiber as already described, and the wavelength dependency can be figured by a straight line having a certain slope. The slope for the optical fiber transmission line 50 is typically 0.06 ps/(nm2·km). The slope for dispersion compensation fibers is typically −0.2 ps/(nm2·km). Therefore, even if the static dispersion compensator 60 is configured so as to compensate for the chromatic dispersion of an optical signal having a certain band of wavelengths, it cannot similarly compensate for the chromatic dispersion of another optical signal having a different band of wavelengths. The static dispersion compensator 60 is thus configured so as to roughly compensate for the chromatic dispersion in the optical fiber transmission line 50 over all wavelengths used in the optical fiber communication system. The static dispersion compensator 60 is not limited to a set of one or more dispersion compensation fibers, and can be an optical waveguide, such as an optical fiber, in which a chirped grating is formed.

The tunable dispersion compensation device 1 included in each of the plurality of optical receiving units 71-1 to 71-m disposed in the optical receiver 70 is so constructed as to dynamically compensate for residual dispersion of an optical signal for a specific channel incident thereon and chromatic dispersion that occurs in the optical receiver 70.

In operation, the optical transmitter 40 multiplexes a plurality of optical signals of different wavelengths each of which carries information and sends out them to the optical fiber transmission line 50. As previously mentioned, the optical fiber transmission line 50 can provide abnormal dispersion (negative group velocity dispersion) for an optical signal of a wavelength of 1550 nm, the chromatic dispersion being typically equal to about 17 ps/nm/km. Therefore, the accumulated chromatic dispersion in the optical fiber transmission line 50 can be about 1700 ps/nm for every 100 km length of the optical fiber transmission line at the wavelength of 1550 nm. On the other hand, the static dispersion compensator 60 can consist of one or more dispersion compensation fibers each of which typically has chromatic dispersion of about −100 ps/nm/km. Therefore, in order to compensate for the chromatic dispersion of about 1700 ps/nm at the wavelength of 1550 nm, a 17 km length of dispersion compensation fiber has to be provided for every 100 km length of the optical fiber transmission line.

As previously mentioned, the static dispersion compensator 60 roughly compensates for the chromatic dispersion in the optical fiber transmission line 50 over all wavelengths used in the optical fiber communication system. In other words, the static dispersion compensator 60 cannot completely compensate for the chromatic dispersion in the optical fiber transmission line 50. Therefore, each of the plurality of multiplexed optical signals which have passed through the static dispersion compensator 60 contains residual dispersion. Furthermore, the chromatic dispersion changes with a transition in the status of the optical fiber transmission line 50, and the static dispersion compensator 60 cannot compensate for such a change in the chromatic dispersion in the optical fiber transmission line 50.

The plurality of multiplexed optical signals with chromatic dispersion, which is statically and roughly compensated for by the static dispersion compensator 60, are further transmitted to the optical receiver 70. The optical receiver 70 demultiplexes the received multiplexed optical signals so as to obtain the plurality of optical signals. In this case, each of the plurality of optical signals has chromatic dispersion due to nonlinear effects in the optical receiver 70 in addition to the residual dispersion.

Each of the plurality of optical receiving units 71-1 to 71-m disposed in the optical receiver 70 dynamically compensates for the chromatic dispersion of a corresponding one of the plurality of optical signals obtained. As previously mentioned, each of the plurality of optical receiving units having the same structure as the optical receiver according to any one of the above-mentioned first through fifth embodiments of the present invention, and having a tunable dispersion compensation device 1 for dynamically compensating for the chromatic dispersion of an input optical signal, a dispersion detector 5, and an optical circulator 6. The tunable dispersion compensation device 1 is designed to produce a predetermined amount of chromatic dispersion in an optical signal of a specific wavelength incident thereon, and the chromatic dispersion has a predetermined range corresponding to the range of the chromatic dispersion of an input optical signal which should be compensated for. The tunable dispersion compensation device 1 is so constructed that the chromatic dispersion provided for an optical signal incident thereon is adjusted, for example, in the case of an optical signal having a wavelength band of 1 nm or less at a wavelength of 1550 nm, the chromatic dispersion can be adjusted within a range of 0 to −100 ps/nm or less or a range of 0 to 100 ps/nm or more. Whether the tunable dispersion compensation device 1 is so constructed as to provide positive chromatic dispersion or negative chromatic dispersion depends on whether the optical signal to be compensated has negative chromatic dispersion or positive chromatic dispersion.

Such dynamic chromatic dispersion compensation by the tunable dispersion compensation device 1 is implemented by control of the pulse widths of a plurality of pulsed currents generated by a pulsed-current supply circuit 10 included in the tunable dispersion compensation device 1 based on the amount of chromatic dispersion detected by the dispersion detector 5, as already described in the above-mentioned first embodiment and so on of the present invention.

As mentioned above, in accordance with the sixth embodiment of the present invention, the optical receiver 70 is provided with a plurality of optical receiving units 71-1 to 71-m, each of which has a dispersion detector 5 for detecting chromatic dispersion of an optical signal incident thereon, which can vary with time, and for generating a control signal having a value corresponding to the detected chromatic dispersion, a tunable dispersion compensation device 1 including a pulsed-current supplying circuit 10 for producing a desired temperature distribution in an optical waveguide 2, in which a chirped grating is formed, by generating and supplying a plurality of pulsed currents to a plurality of heaters arranged along the optical axis of the optical waveguide 2, respectively, according to the control signal from the dispersion detector 5, so as to cause the optical waveguide 2 to dynamically compensate for the chromatic dispersion of the optical signal, and an optical circulator 6 for guiding the optical signal having the chromatic dispersion to be compensated for to the tunable dispersion compensation device 1, and for guiding the optical signal dispersion-compensated by the tunable dispersion compensation device 1 to the dispersion detector 5. Accordingly, the optical fiber communication system can precisely and dynamically compensate for chromatic dispersion of each demultiplexed optical signal having a certain band of wavelengths. Therefore, the present embodiment offers an advantage of being able to efficiently, precisely, and dynamically compensate for residual chromatic dispersion in the optical fiber communication system.

Instead of the static dispersion compensator 60 which includes one or more dispersion compensation fibers or an optical waveguide, such as an optical fiber, in which a chirped grating is formed, a tunable dispersion compensation module having the same structure as the optical receiver according to any one of the first through fifth embodiments of the present invention can be coupled to the optical fiber transmission line 50, even though redundancy exists in such a system. In this case, the tunable dispersion compensation module coupled to the optical fiber transmission line 50 dynamically compensates for chromatic dispersion in the optical fiber transmission line 50 which varies with time. Furthermore, the plurality of optical receiving units 71-1 to 71-m can be disposed outside the optical receiver 70. However, when these optical receiving units are coupled directly to the optical fiber transmission line 50, it is impossible to dynamically compensate for chromatic dispersion in the optical receiver 70.

Many widely different embodiments of the present invention may be constructed without departing from the spirit and scope of the present invention. It should be understood that the present invention is not limited to the specific embodiments described in the specification, except as defined in the appended claims.

What is claimed is:

1. A tunable dispersion compensation device comprising:
    an optical waveguide having a grating;
    a plurality of heaters arranged along an optical axis of said optical waveguide; and
    a pulsed-current supplying means for producing a desired temperature distribution in said grating by supplying a plurality of pulsed currents to said plurality of heaters, respectively.

2. The tunable dispersion compensation device according to claim 1, wherein said grating is a chirped grating.

3. The tunable dispersion compensation device according to claim 1, wherein said pulsed-circuit supplying means includes a pulse width control means for adjusting pulse widths of the plurality of pulsed currents supplied to said plurality of heaters, respectively, according to the desired temperature distribution to be produced in said grating.

4. The tunable dispersion compensation device according to claim 1, wherein said pulsed-current supplying means supplies the plurality of pulsed currents to said plurality of heaters at different times, respectively.

5. The tunable dispersion compensation device according to claim 1, wherein said pulsed-current supplying means divides the plurality of pulsed currents into a plurality of groups and supplies pulsed currents included in different groups to corresponding heaters at different times, respectively.

6. The tunable dispersion compensation device according to claim 1, wherein said pulsed-current supplying means includes a DC power supply, an EMI elimination filter for eliminating noise included in a DC output from said DC power supply, and a switching means for generating the plurality of pulsed currents from an output of said EMI elimination filter.

7. The tunable dispersion compensation device according to claim 1, wherein the pulse widths of the plurality of pulsed currents supplied to said plurality of heaters, respectively are increased or decreased in the order that said plurality of heater respectively associated with the plurality of pulsed currents are arranged along the optical axis of said waveguide.

8. The tunable dispersion compensation device according to claim 7, wherein the pulse widths of the plurality of pulsed currents are increased or decreased linearly.

9. The tunable dispersion compensation device according to claim 8, wherein said pulse width control means includes a pulse width determining means for determining the pulse widths of the plurality of pulsed currents on an initial value and a pulse width increment.

10. The tunable dispersion compensation device according to claim 9, wherein said pulse width control means includes a correction means for correcting the pulse widths of the plurality of pulsed currents determined by said pulse width determining means using a plurality of correction coefficients that are predetermined for said plurality of heaters, respectively.

11. The tunable dispersion compensation device according to claim 7, wherein the pulse widths of the plurality of pulsed currents supplied to said plurality of heaters, respectively, are increased or decreased nonlinearly.

12. The tunable dispersion compensation device according to claim 11, wherein said pulse width control means includes a pulse width determining means for determining the pulse widths of the plurality of pulsed currents based on an initial value, a pulse width increment, and a plurality of correction coefficients that are predetermined for said plurality of heaters, respectively.

13. The tunable dispersion compensation device according to claim 4, wherein said pulsed-current supplying means includes a DC power supply, a switching means including a plurality of switches (referred to as first to nth switches from here on) each for generating a pulsed current from a DC output from said DC power supply in response to a control pulse applied thereto, and a control pulse generation means for generating a control pulse to be supplied to the (i+1)th (i=1 to n−1) switch based on the pulsed current generated by the ith switch.

14. The tunable dispersion compensation device according to claim 4, wherein said pulsed-current supplying means includes a DC power supply, a switching means including a plurality of switches (referred to as first to nth switches from here on) each for generating a pulsed current from a DC output from said DC power supply in response to a control pulse applied thereto, and a control pulse generation means for generating a control pulse to be supplied to the (i+1)th (i=1 to n−1) switch based on a pulse which is delayed by a predetermined tune interval with respect to a control pulse supplied to the ith switch.

15. An optical receiver comprising:
   a dispersion detector for detecting chromatic dispersion of an optical signal incident thereon, and for generating a control signal having a value corresponding to the detected chromatic dispersion;
   a tunable dispersion compensation device including an optical waveguide having a grating, a plurality of heaters arranged along an optical axis of said optical waveguide, and a pulsed-current supplying means for producing a desired temperature distribution in said grating by supplying a plurality of pulsed currents to said plurality of heaters, respectively, according to the control signal from said dispersion detector; and
   an optical circulator for guiding the optical signal with chromatic dispersion to be compensated for to said dispersion compensation device, and for guiding the optical signal compensated by said dispersion compensation device to said dispersion detector.

16. The optical receiver according to claim 15, wherein said pulsed-current supplying means of said tunable dispersion compensation device includes a pulse width control means for adjusting pulse widths of the plurality of pulsed currents supplied to said plurality of heaters, respectively, according to the desired temperature distribution to be produced in said grating.

17. The optical receiver according to claim 15, wherein said pulsed-current supplying means of said tunable dispersion compensation device supplies the plurality of pulsed currents to said plurality of heaters at different times, respectively.

18. An optical fiber communication system including an optical transmitter for multiplexing a plurality of optical signals having different wavelengths, an optical fiber transmission line via which the plurality of optical signals multiplexed by said optical transmitter are transmitted, an optical receiver for demultiplexing the plurality of optical signals multiplexed and received via said optical fiber transmission line and for demodulating information that the plurality of optical signals carry, and a tunable dispersion compensation means for compensating for chromatic dispersion of each of the plurality of said optical signals transmitted via said optical fiber transmission line, said optical tunable dispersion compensation means comprising:
   at least a tunable dispersion compensation device including an optical waveguide having a grating, a plurality of beaters arranged along an optical axis of said optical waveguide, and a pulsed-current supplying means for producing a desired temperature distribution in said grating by supplying a plurality of pulsed currents to said plurality of heaters, respectively.

19. The optical fiber communication system according to claim 18, further comprising a static dispersion compensation means coupled to said optical fiber transmission line, for compensating for a different, fixed amount of chromatic dispersion of each of the plurality of optical signals transmitted via said optical fiber transmission line.

20. The optical fiber communication system according to claim 18, wherein said optical tunable dispersion compensation means includes a plurality of optical receiving means disposed in said optical receiver, each for compensating for chromatic dispersion of a corresponding one of the plurality of optical signals demultiplexed, and each of said plurality of optical receiving means comprises a dispersion detector for detecting chromatic dispersion of a corresponding one of the plurality of optical signals, and for generating a control signal having a value corresponding to the detected chromatic dispersion, a tunable dispersion compensation device including an optical waveguide having a grating, a plurality of heaters arranged along an optical axis of said optical waveguide, and a pulsed-current supplying means for producing a desired temperature distribution in said grating by supplying a plurality of pulsed currents to said plurality of heaters, respectively, according to the control signal from said dispersion detector, and an optical circulator for guiding the optical signal with chromatic dispersion to be compensated for to said tunable dispersion compensation device, and for guiding the optical signal compensated by said tunable dispersion compensation device to said dispersion detector.

21. The optical fiber communication system according to claim 18, wherein said pulsed-current supplying means of said tunable dispersion compensation device has a pulse width control means for adjusting pulse widths of the plurality of pulsed currents supplied to said plurality of heaters, respectively, according to the desired temperature distribution to be produced in said grating.

22. The optical fiber communication system according to claim 18, wherein said pulsed-current supplying means supplies the plurality of pulsed currents to said plurality of heaters at different times, respectively.

23. A method of compensating for chromatic dispersion of an optical signal by using an optical waveguide having a grating, said method comprising the step of:
   producing a desired temperature distribution in said grating by supplying a plurality of pulsed currents to a plurality of heaters, respectively, said plurality of heaters being arranged along an optical axis of said optical waveguide.

24. The method according to claim 23, further comprising the steps of:
   detecting chromatic dispersion of the optical signal, generating a control signal having a value corresponding to the detected chromatic dispersion, and supplying a plurality of pulsed currents to said plurality of heaters, respectively, according to the control signal.

* * * * *